(12) United States Patent
Jung et al.

(10) Patent No.: US 10,524,149 B2
(45) Date of Patent: Dec. 31, 2019

(54) APPARATUS AND METHOD FOR RADIO CONNECTION IN WIRELESS COMMUNICATION SYSTEM

(71) Applicant: Samsung Electronics Co., Ltd., Suwon-si, Gyeonggi-do (KR)

(72) Inventors: Hakyung Jung, Seoul (KR); Beomsik Bae, Suwon-si (KR); Jinho Lee, Seoul (KR); Jinhyoung Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 15/371,854

(22) Filed: Dec. 7, 2016

(65) Prior Publication Data
US 2017/0171771 A1    Jun. 15, 2017

(30) Foreign Application Priority Data

Dec. 10, 2015  (KR) .......................... 10-2015-0176098

(51) Int. Cl.
| | | |
|---|---|---|
| *H04W 24/10* | (2009.01) | |
| *H04W 36/00* | (2009.01) | |
| *H04W 72/12* | (2009.01) | |
| *H04W 88/06* | (2009.01) | |
| *H04W 88/08* | (2009.01) | |

(52) U.S. Cl.
CPC ........ *H04W 24/10* (2013.01); *H04W 36/0094* (2013.01); *H04W 72/1215* (2013.01); *H04W 88/06* (2013.01); *H04W 88/08* (2013.01)

(58) Field of Classification Search
CPC . H04W 24/10; H04W 72/1215; H04W 88/08; H04W 88/06; H04W 36/0094
See application file for complete search history.

(56) References Cited

U.S. PATENT DOCUMENTS

| 8,423,013 | B2 | 4/2013 | Narasimha et al. | |
|---|---|---|---|---|
| 8,626,151 | B2 * | 1/2014 | Beppler | ................ H04W 48/18 370/252 |
| 9,198,098 | B2 * | 11/2015 | Yang | ................ H04W 52/0245 |
| 9,198,229 | B2 * | 11/2015 | Lee | ....................... H04W 88/06 |
| 9,660,710 | B2 * | 5/2017 | Chou | ................... H04B 7/0469 |
| 9,781,761 | B2 * | 10/2017 | Adjakple | .......... H04W 28/0252 |
| 9,907,006 | B2 * | 2/2018 | Walley | ................ H04W 36/245 |
| 9,927,808 | B2 * | 3/2018 | Wanstedt | ............. B64C 39/024 |

(Continued)

*Primary Examiner* — Brian T O Connor
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as long term evolution (LTE). The present disclosure relates to a wireless communication system supporting a multi-radio access technology (RAT). A method of operating a base station (BS) supporting a first RAT is provided. The method includes receiving information indicating a communication requirement from a terminal, determining whether the terminal needs to be connected with a different BS through a second RAT on the basis of the received information indicating the communication requirement, and if the terminal needs to be connected with the different BS through the second RAT, transmitting to the terminal a measurement configuration message for the second RAT.

21 Claims, 18 Drawing Sheets

(56) References Cited

U.S. PATENT DOCUMENTS

| | | | | |
|---|---|---|---|---|
| 10,182,379 B2* | 1/2019 | Jheng | H04W 36/0083 |
| 10,389,498 B2* | 8/2019 | Park | H04W 72/0426 |
| 2009/0168701 A1* | 7/2009 | White | H04L 12/5692 |
| | | | | 370/328 |
| 2011/0319071 A1* | 12/2011 | Beppler | H04W 48/18 |
| | | | | 455/424 |
| 2012/0184265 A1* | 7/2012 | Love | H04W 72/1215 |
| | | | | 455/424 |
| 2013/0337863 A1* | 12/2013 | Lee | H04W 88/06 |
| | | | | 455/524 |
| 2014/0355566 A1* | 12/2014 | Walley | H04W 36/245 |
| | | | | 370/331 |
| 2015/0092566 A1* | 4/2015 | Balachandran | H04W 8/22 |
| | | | | 370/242 |
| 2015/0289282 A1* | 10/2015 | Phuyal | H04W 76/14 |
| | | | | 370/329 |
| 2016/0037388 A1* | 2/2016 | Yang | H04W 76/38 |
| | | | | 370/332 |
| 2016/0050709 A1* | 2/2016 | Bergstrom | H04W 76/16 |
| | | | | 455/450 |
| 2016/0234749 A1* | 8/2016 | Singh | H04W 36/0022 |
| 2016/0277974 A1* | 9/2016 | Persson | H04W 48/16 |
| 2018/0098274 A1* | 4/2018 | Thangarasa | H04W 76/14 |
| 2018/0227784 A1* | 8/2018 | Kim | H04W 24/08 |

* cited by examiner

APPARATUS AND METHOD FOR RADIO CONNECTION IN WIRELESS COMMUNICATION SYSTEM

CROSS-REFERENCE TO RELATED APPLICATION(S)

This application claims the benefit under 35 U.S.C. § 119(a) of a Korean patent application filed on Dec. 10, 2015 in the Korean Intellectual Property Office and assigned Ser. No. 10-2015-0176098, the entire disclosure of which is hereby incorporated by reference.

TECHNICAL FIELD

The present disclosure relates to a wireless communication system supporting a multi-radio access technology (RAT).

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A network of a typical 5G communication system may be configured to simultaneously support a multi-radio access technology (RAT) to achieve a wider network coverage and a higher data transfer rate. An example of the RAT includes global systems mobile (GSM), wideband channel division multiple access (WCDMA), high-speed packet access (HSPA), LTE Release 10 carrier aggregation (including a beyond release technique), Institute of Electrical and Electronics Engineers (IEEE) 802.11b/a/g/n/ac/ad/ax/ay, IEEE 802.16a/e, IEEE 802.20, Code Division Multiple Access 2000 1× (CDMA2000 1×) and cdma2000 Evolution-Data Optimized (cdma200 EV-DO), or the like.

More specifically, the network of the 5G communication system is configured in such a manner that a master evolved Node B (MeNB) having a relatively great coverage overlaps with a secondary eNB (SeNB) having a relatively small coverage. Herein, the MeNB includes an anchor eNB, and the SeNB includes a small eNB, an assisting eNB, or a slave eNB. The MeNB and the SeNB may use the same RAT, or may use a different RAT optimized for each overage and usage. For example, in the 5G communication system, the MeNB may use an LTE which is an RAT of a low band (e.g., less than or equal to 6 GHz) for providing a wide coverage, and the SeNB has a relatively small coverage but may use IEEE 802.11ad which is an RAT of an extremely high frequency band (e.g., 60 GHz) capable of achieving a greater data transfer rate.

In the 5G communication system in which the MeNB (or a master RAT (M-RAT)) and the SeNB (or a secondary RAT (S-RAT)) are used in an overlapping manner as described above, a user equipment (UE) basically maintains a connection with the MeNB. Further, the UE may establish an additional connection with the SeNB according to an instruction of the MeNB. However, if the UE is connected with the SeNB according to the instruction of the MeNB, power consumption of the UE is increased since the UE is connected with the SeNB even in a situation where the UE does not have to be connected with the SeNB.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for determining whether a terminal requires a connection with a second base station (second BS) in a wireless communication system supporting a multi-radio access technology (RAT).

Another aspect of the present disclosure is to provide an apparatus and method in which a terminal performs a measurement on a second BS to a minimum extent, on the basis of a communication requirement based on a running application of the terminal in a wireless communication system supporting a multi-RAT.

Another aspect of the present disclosure is to provide an apparatus and method in which a terminal performs a measurement on a second BS to a minimum extent, on the basis of information regarding a radio resource of a first base station (first BS) and the second BS in a wireless communication system supporting a multi-RAT.

Another aspect of the present disclosure is to provide an apparatus and method in which a BS determines whether to transmit to a terminal a measurement configuration message for a second BS, on the basis of a communication requirement of the terminal in a wireless communication system supporting a multi-RAT.

Another aspect of the present disclosure is to provide an apparatus and method for determining whether to perform a measurement on a second BS, on the basis of a communication requirement according to a running application of a terminal in a wireless communication system supporting a multi-RAT.

In accordance with an aspect of the present disclosure, a method of operating a BS supporting a first RAT is provided. The method includes receiving information indicating a communication requirement from a terminal, determining whether the terminal needs to be connected with a different BS through a second RAT on the basis of the received information indicating the communication requirement, and if the terminal needs to be connected with the different BS through the second RAT, transmitting to the terminal a measurement configuration message for the second RAT.

In accordance with another aspect of the present disclosure, a method of operating a terminal is provided. The method includes transmitting information indicating a communication requirement of the terminal to a first BS connected through a first RAT, and receiving a measurement configuration message for a second RAT in response to the transmission.

In accordance with another aspect of the present disclosure, a method of operating a BS supporting a first RAT is provided. The method includes transmitting to the terminal a measurement configuration message for a second RAT, receiving from the terminal a measurement report message for the second RAT, and determining whether the terminal is connected with the second RAT, wherein the measurement configuration message for the second RAT includes a condition for a communication requirement to be satisfied in the terminal to trigger a measurement event for the second RAT.

In accordance with another aspect of the present disclosure, a method of operating a terminal is provided. The method includes receiving a measurement configuration message for a second RAT from a first BS through a first RAT, determining whether a connection with a second BS is necessary through the second RAT on the basis of information indicating a communication requirement of the terminal, and if the connection with the second BS is necessary through the second RAT, measuring a signal of the second RAT on the basis of the measurement configuration message.

In accordance with another aspect of the present disclosure, a BS supporting a first RAT is provided. The BS includes a communication module, and at least one processor, wherein the at least one processor is configured to receive information indicating a communication requirement from a terminal, determine whether the terminal needs to be connected with a different BS through a second RAT on the basis of the received information indicating the communication requirement, and if the terminal needs to be connected with the different BS through the second RAT, transmit to the terminal a measurement configuration message for the second RAT.

In accordance with another aspect of the present disclosure, a terminal is provided. The terminal includes a communication module, and at least one processor, wherein the at least one processor is configured to transmit information indicating a communication requirement of the terminal to a first BS connected through a first RAT, and receive a measurement configuration message for a second RAT in response to the transmission.

In accordance with another aspect of the present disclosure, a BS supporting a first RAT is provided. The BS includes a communication module, and at least one processor, wherein the at least one processor is configured to transmit to the terminal a measurement configuration message for a second RAT, receive from the terminal a measurement report message for the second RAT, and determine whether the terminal is connected with the second RAT, wherein the measurement configuration message for the second RAT comprises a condition for a communication requirement to be satisfied in the terminal to trigger a measurement event for the second RAT.

In accordance with another aspect of the present disclosure, a terminal is provided. The terminal includes a communication module, and at least one processor, wherein the at least one processor is configured to receive a measurement configuration message for a second RAT from a first BS through a first RAT, determine whether a connection with a second BS is necessary through the second RAT on the basis of information indicating a communication requirement of the terminal, and if the connection with the second BS is necessary through the second RAT, measure a signal of the second RAT on the basis of the measurement configuration message.

Since whether a connection with a second BS is necessary through a secondary RAT (S-RAT) and whether signal measurement is performed on the second BS are determined on the basis of a communication requirement of a terminal based on a running application of the terminal connected with an first BS through an M-RAT in a wireless communication system supporting a multi-RAT, unnecessary signal measurement may be performed on the second BS to a minimum extent and/or the connection with the second BS may be established to a minimum extent. Accordingly, power consumption of the terminal can be decreased.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
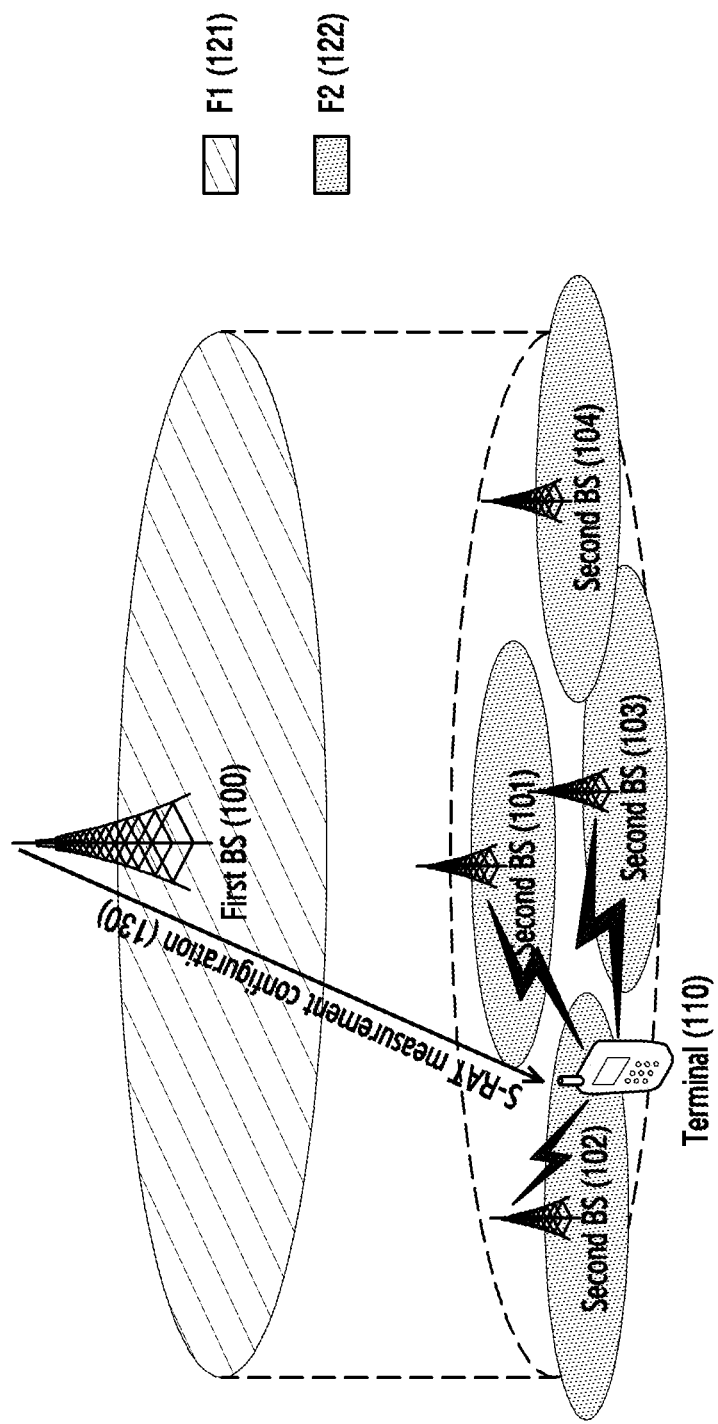
FIG. 1 illustrates a structure of a wireless communication system supporting a multi-radio access technology (RAT) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the present disclosure describes a technique for determining whether a terminal requires a connection with a second base station (second BS) in a wireless communication system supporting a multi-radio access technology (RAT).

In the following description, terms referring to a radio access technology, information, a state change (e.g., an event), network entities, messages, a constitutional element of a device, or the like are exemplified for convenience of explanation. Therefore, the present disclosure is not limited to the terminologies described below, and other terminologies having identical technical meanings may also be used.

Hereinafter, the term ' . . . unit', ' . . . device', or the like implies an apparatus or device for processing at least one function or operation, and may be implemented in hardware or software or in combination of the hardware and the software.

For convenience of explanation, some terms and names defined in the 3$^{rd}$ generation partnership project (3GPP) long term evolution (LTE) standard, or Institute of Electrical and Electronics Engineers (IEEE) 802.11 standard may be used. However, the present disclosure is not limited to the above terms and names, and thus may also be equally applied to a system conforming to another standard.

In various embodiments, the terminal may be a user equipment (UE), an electronic device, and a portable electronic device, and may be one of a smart phone, a portable terminal, a mobile phone, a mobile pad, a media player, a tablet computer, a handheld computer, and a personal digital assistant (PDA). Further, the terminal may be a device configured by combining two or more functions of the aforementioned devices.

In various embodiments, the first base station (first BS) may be a master evolved Node B (MeNB) or a master BS. In various embodiments, the second BS may be a secondary evolved Node B (SeNB) or a secondary BS.

FIG. 1 illustrates a structure of a wireless communication system supporting a multi-RAT according to an embodiment of the present disclosure.

Referring to FIG. 1, the wireless communication system supporting the multi-RAT may be configured of a coverage area of a first BS 100 (e.g. MeNB) and a coverage area of second BSs 101, 102, 103 and 104 (e.g. SeNBs) in an overlapping manner. According to an embodiment, the first BS 100 may use a 1$^{st}$ RAT (e.g., LTE) of a low frequency band (e.g., F1 121) which provides a relatively wide coverage, and each of the second BSs 101 to 104 may use a 2$^{nd}$ RAT (e.g., IEEE 802.11ad) of an extremely high frequency band (e.g., F2 122) which provides a relatively narrow coverage and has a high data transfer rate. According to another embodiment, the first BS 100 may use the 1$^{st}$ RAT, and the second BS may use the 1$^{st}$ RAT and the 2$^{nd}$ RAT at the same time. For convenience of explanation, the present disclosure is explained hereinafter under the assumption that the first BS 100 uses the 1$^{st}$ RAT (hereinafter, also referred to as a master RAT (M-RAT)), and each of the second BSs 101 to 104 uses the 2$^{nd}$ RAT (hereinafter, also referred to as a secondary RAT (S-RAT)). However, the present disclosure is not limited thereto.

The first BS 100 uses the M-RAT to establish a radio connection with a terminal 110. The first BS 100 may operate or process a control plane and a data plane with respect to the terminal 110 (e.g. the UE). The first BS 100 may transmit an S-RAT measurement configuration message 130 to the terminal 110. Herein, a pre-set event may occur at a pre-set time point or periodically. Further, the pre-set event may occur on the basis of a communication requirement of the terminal and/or information regarding a radio resource of the first BS 100 and the second BSs 101 to 104. For example, the first BS 100 may transmit the S-RAT measurement configuration message 130 to the terminal 110 at a pre-set time point or at a pre-set period. For another example, the first BS 100 may determine whether an S-RAT connection of the terminal 110 is necessary on the basis of the communication requirement of the terminal and/or the information regarding the radio resource of the first BS 100 and the second BS 101 to 104, and if it is determined the S-RAT connection is necessary, may transmit the S-RAT measurement configuration message 130 to the terminal 110.

Each of the second BSs 101 to 104 may establish a radio connection with the terminal 110 by using the S-RAT. Each of the second BSs 101 to 104 may periodically transmit a reference signal. If the terminal 110 is additionally connected with the second BS in a state of maintaining a connection with the first BS 100, each of the second BSs 101 to 104 may operate or process the data plane for the terminal 110.

Basically, the terminal 110 may establish a radio connection with the first BS 100 through the M-RAT. Further, the terminal 110 receives the S-RAT measurement configuration message 130 from the first BS 100, and according to the S-RAT measurement configuration message, may receive and measure a signal from at least one of the neighboring second BSs 101 to 104. According to an embodiment, the terminal 110 may determine whether to perform an S-RAT measurement on the basis of the communication requirement of the terminal and/or the information regarding the radio resource of the first BS 100 and the second BSs 101 to 104. Herein, the communication requirement of the terminal may be determined on the basis of an application (hereinafter, also referred to as an 'app') running in the terminal 110. The terminal 110 may establish an additional connection with any one of the second BSs 101 to 104 according to an S-RAT measurement result.

As described above, whether the terminal 110 performs the S-RAT measurement and/or establishes the S-RAT connection may be determined by the first BS 100 or may be directly determined by the terminal 110. Various embodiments described hereinafter will be explained for a case where whether to perform the S-RAT and/or whether to establish the S-RAT connection are determined by the first BS 100 and a case where they are determined by the terminal 110.

Figure 2:
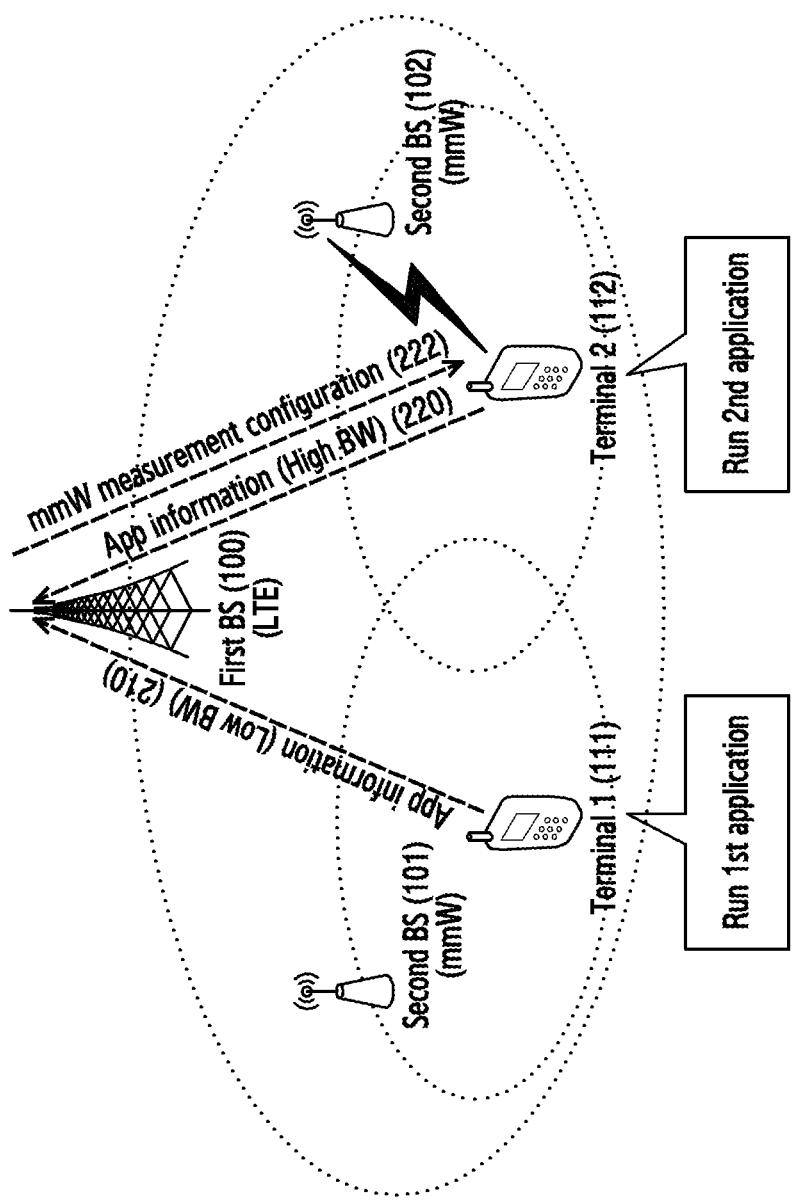
FIG. 2 illustrates whether a second base station (second BS) is measured on the basis of a running application of a terminal in a wireless communication system supporting a multi-RAT according to an embodiment of the present specification according to an embodiment of the present disclosure.

FIG. 2 illustrates whether a second BS is measured on the basis of a running application of a terminal in a wireless communication system supporting a multi-RAT according to an embodiment of the present disclosure. Herein, an embodiment is described in brief in which the first BS 100 determines whether the terminal performs an S-RAT measurement and/or establishes an S-RAT connection.

Referring to FIG. 2, in a wireless communication system in which the first BS 100 supporting LTE overlaps with the second BS 101 and 102 supporting mmW, each of a $1^{st}$ terminal 111 and a $2^{nd}$ terminal 112 establishes a connection with the first BS 100 through LTE.

Thereafter, the $1^{st}$ terminal 111 may run a $1^{st}$ application requiring a low bandwidth under the control of a user, and the $2^{nd}$ terminal 112 may run a $2^{nd}$ application requiring a high bandwidth under the control of the user. According to an embodiment, the $1^{st}$ terminal 111 may transmit to the first BS 100 an app information message 210 indicating that the running $1^{st}$ application requires the low bandwidth. Further, the $2^{nd}$ terminal 112 may transmit to the first BS 100 an app information message 220 indicating that the running $2^{nd}$ application requires the high bandwidth. For example, the $1^{st}$ application may be a social network service message application or an electronic mail application or the like. Further, the $2^{nd}$ application may be an application supporting video streaming or an application supporting transmission/reception of a large-sized file or the like. The aforementioned applications are purposes only, and thus an embodiment of the present disclosure is not limited to the aforementioned applications. Herein, the low bandwidth implies a bandwidth lower than or equal to a pre-set threshold, and the high bandwidth implies a bandwidth higher than the pre-set threshold.

The first BS 100 may confirm that the $1^{st}$ terminal 111 requires the low bandwidth by analyzing the app information message 210 received from the $1^{st}$ terminal 111. Since the $1^{st}$ terminal 111 requires the low bandwidth, the first BS 100 may determine that there is no need to connect to the second BS 101 or 102, and may not transmit to the $1^{st}$ terminal 111 a measurement configuration message for mmW.

Meanwhile, the first BS 100 may confirm that the $2^{nd}$ terminal 112 requires the high bandwidth by analyzing the app information message 220 received from the $2^{nd}$ terminal 112. Since the $2^{nd}$ terminal 112 requires the high bandwidth, the first BS 100 may determine that there is a need to connect to the second BS 101 or 102, and may not transmit to the $2^{nd}$ terminal 112 a measurement configuration message 222 for mmW. After receiving the measurement configuration message for mmW, the $2^{nd}$ terminal 112 may receive and measure a signal from the second BS 102 supporting mmW. According to an embodiment, if it is determined that there is a need to connect to the second BS 101 or 102 on the basis of a required bandwidth of the $2^{nd}$ terminal 112, the first BS 100 may determine whether to transmit the measurement configuration message 222 for mmW to the $2^{nd}$ terminal 112 additionally on the basis of information regarding a radio resource of the first BS 100 and the second BS 101 or 102.

As described above, in an embodiment of the present disclosure, the first BS may confirm a required bandwidth of an application currently running in the terminal, and only when the running application requires a high bandwidth greater than or equal to a threshold, may transmit to the terminal a measurement configuration message for an S-RAT.

Figure 3:
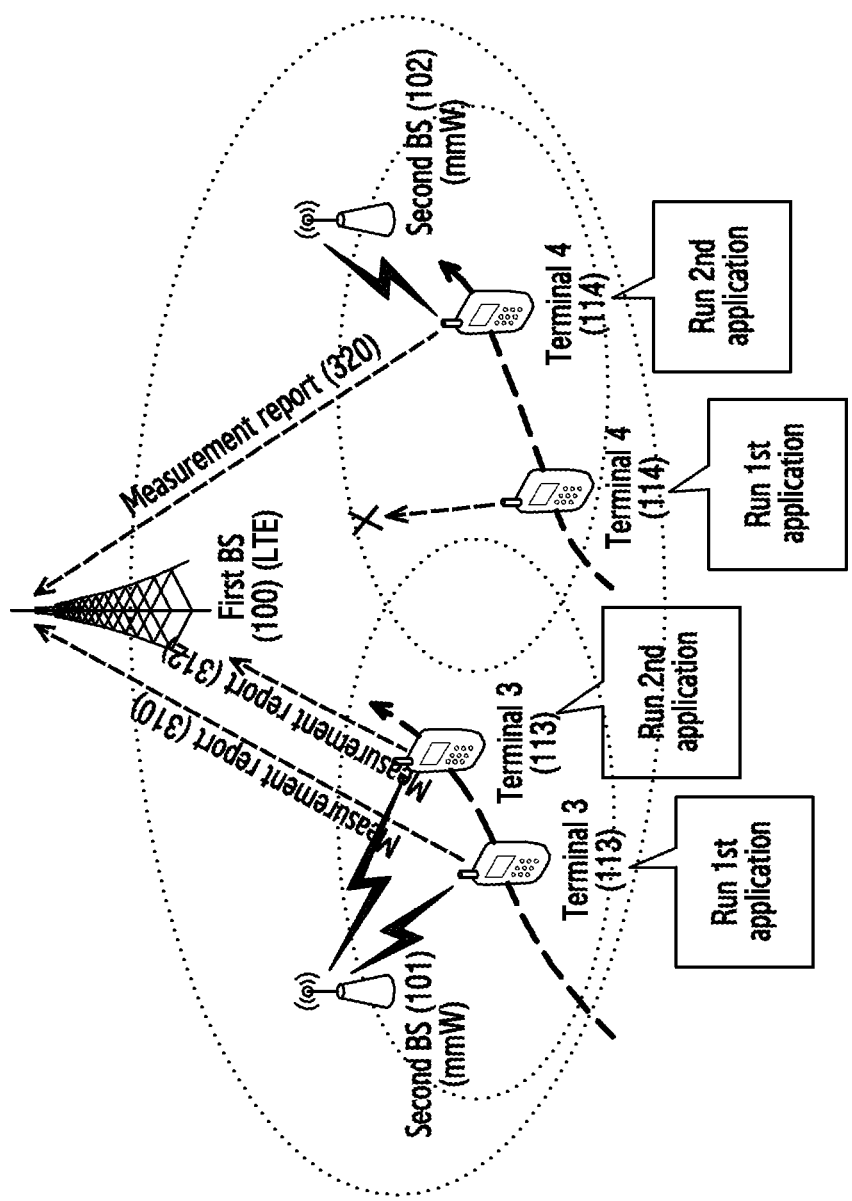
FIG. 3 illustrates whether a second BS is connected with a terminal according to an embodiment of the present specification in comparison with a conventional terminal in a wireless communication system supporting a multi-RAT according to an embodiment of the present disclosure.

FIG. 3 illustrates whether a second BS is connected with a terminal according to an embodiment of the present specification in comparison with a conventional terminal in a wireless communication system supporting a multi-RAT according to an embodiment of the present disclosure.

Herein, a $3^{rd}$ terminal 113 may imply a terminal according to the conventional method and a $4^{th}$ terminal 114 may imply a terminal according to an embodiment of the present disclosure. Herein, an embodiment of determining whether the $4^{th}$ terminal 114 measures an S-RAT and/or connects the S-RAT is described in brief.

Referring to FIG. 3, in a wireless communication system in which the first BS 100 supporting LTE overlaps with the second BS 101 and 102 supporting mmW, each of the $3^{rd}$ terminal 113 and the $4^{th}$ terminal 114 establishes a connection with the first BS 100 through LTE. Thereafter, the first BS 100 may transmit to the $3^{rd}$ terminal 113 and the $4^{th}$ terminal 114 a measurement configuration message for mmW, i.e., an S-RAT, according to a pre-set event. In this case, it is assumed that a $1^{st}$ application requiring a low bandwidth is running at a $1^{st}$ time point in each of the $3^{rd}$ terminal 113 and the $4^{th}$ terminal 114, and a $2^{nd}$ application requiring a high bandwidth is running at a $2^{nd}$ time point.

The $3^{rd}$ terminal 113 measures a signal for the second BS 101 through mmW at each of the $1^{st}$ time point and the $2^{nd}$ time point, and transmits measurement report messages 310 and 312 to the first BS 100. That is, the $3^{rd}$ terminal measures a signal for the second BS irrespective of a required bandwidth of an application to be run, and transmits the measurement report message to the first BS 100. Meanwhile, the $4^{th}$ terminal 114 may determine that there is no need to connect to the second BS 102 at the $1^{st}$ time point at which the $1^{st}$ application requiring the low bandwidth runs and there is a need to connect to the second BS 102 at the $2^{nd}$ time point at which the $2^{nd}$ application requiring the high bandwidth runs. Therefore, the $4^{th}$ terminal 114 does not perform a signal measurement on the second BS 102 at the $1^{st}$ time point, and thus does not transmit a measurement result report message. On the other hand, the $4^{th}$ terminal 114 may perform a signal measurement on the second BS 102 at the $2^{nd}$ time point, and may transmit a measurement report message 320 indicating a signal measurement result to the first BS 100.

That is, in an embodiment of the present disclosure, the terminal may confirm a bandwidth required in a currently running application, and only when the currently running application requires a bandwidth greater than or equal to a threshold, may perform a measurement and/or a measurement report on the S-RAT.

Figure 4:
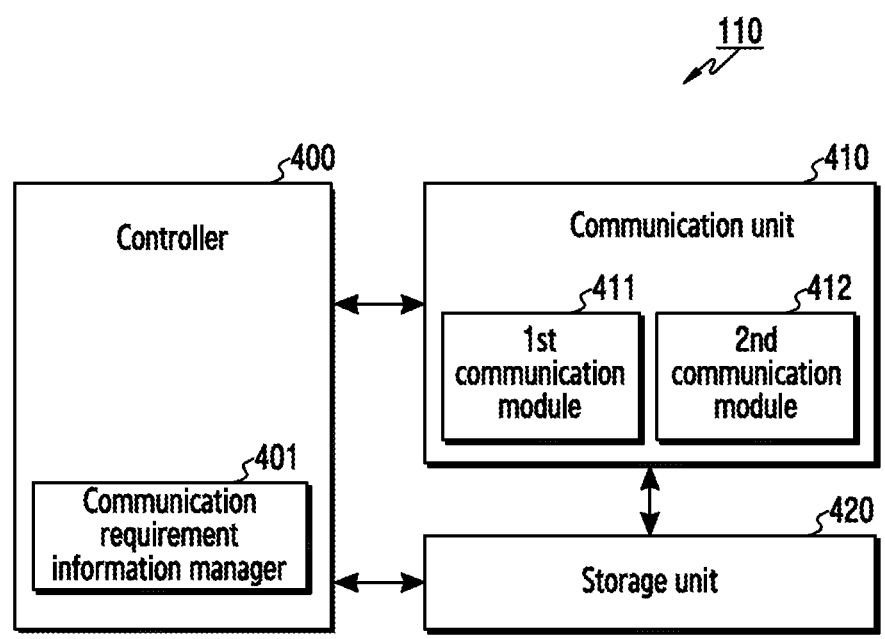
FIG. 4 is a block diagram of a terminal according to an embodiment of the present disclosure.

FIG. 4 is a block diagram of a terminal according to an embodiment of the present disclosure.

Referring to FIG. 4, the terminal 110 may include a controller 400, a communication unit 410, and a storage unit 420.

The controller 400 controls and processes an overall operation of the terminal 110. The controller 400 may include at least one processor. The controller 400 may include a communication requirement information manager 401. The communication requirement information manager 401 collects and/or acquires information regarding a communication requirement of the terminal 110 on the basis of an application running in the terminal 110. For example, the communication requirement information manager 401 may collect an identifier of the running application, a feature of the running application, a screen direction, an operator policy, and active flow information, and may acquire information regarding a communication requirement based on the running application according to the collected information. The communication requirement information manager 401 may acquire the information regarding the communication requirement by additionally considering a remaining amount of a battery and information regarding whether the battery is charged. The communication requirement information manager 401 may provide the communication unit 410 with the information regarding the communication requirement. Herein, the information regarding the communication requirement may include information indicating whether an S-RAT connection of the terminal is necessary. Further, the information regarding the communication requirement may include information of a bandwidth or a latency. Further, the information regarding the communication requirement may include class information classified on the basis of the bandwidth or the latency.

The communication unit 410 communicates with the first BS 100 and communicates with the second BS under the control of the controller 400. The communication unit 410 may include a $1^{st}$ communication module 411 for supporting an M-RAT and a $2^{nd}$ communication module 412 for supporting an S-RAT. The communication unit 410 may establish a basic connection with the first BS 100 through the $1^{st}$ communication module 411, and may establish an additional connection with the second BS through the $2^{nd}$ communication module 412.

According to an embodiment, the communication unit 410 may transmit to the first BS 100 the information regarding the communication requirement and received from the controller 400 through the $1^{st}$ communication module 411. Upon receiving an S-RAT measurement configuration message from the first BS 100, the communication unit 410 may transition the $2^{nd}$ communication module 412 from a power-off state to a power-on state, or may transition it from an inactive state to an active state. The communication unit 410 may receive a signal from the second BS by using the $2^{nd}$ communication module 412 in the on state (or the active state), and may transmit a signal reception result to the first BS 100 through the $1^{st}$ communication module 411.

According to another embodiment, upon receiving the S-RAT measurement configuration message from the first BS 100 through the $1^{st}$ communication module 411, the communication unit 410 may determine whether to perform an S-RAT measurement on the basis of the information regarding the communication requirement and received from the controller 400. Upon determining that the S-RAT measurement is performed, the communication unit 410 may transition the $2^{nd}$ communication module 412 from the power-off state to the power-on state, or may transition it from the inactive state to the active state. The communication unit 410 may receive a signal from the second BS by using the $2^{nd}$ communication module 412 in the on state (or the active state), and may transmit a signal reception result to the first BS 100 through the $1^{st}$ communication module 411. Herein, upon determining that the S-RAT measurement is not performed, the communication unit 410 may provide control such that the $2^{nd}$ communication module transitions to the power-off state or the inactive state.

Upon receiving a message indicating a connection for the second BS from the first BS 100 through the $1^{st}$ communication module 411, the communication unit 410 may transmit/receive a signal for the connection with the second BS through the $2^{nd}$ communication module 412.

The storage unit 420 stores a basic program, an application program, and a variety of data for an overall operation of the terminal 110. In particular, the storage unit 420 may store a unique identifier of an application, required bandwidth information of the application, required bandwidth information based on a screen direction, operator policy information acquired by an access network discovery service function (ANDSF), or the like.

Figure 5:
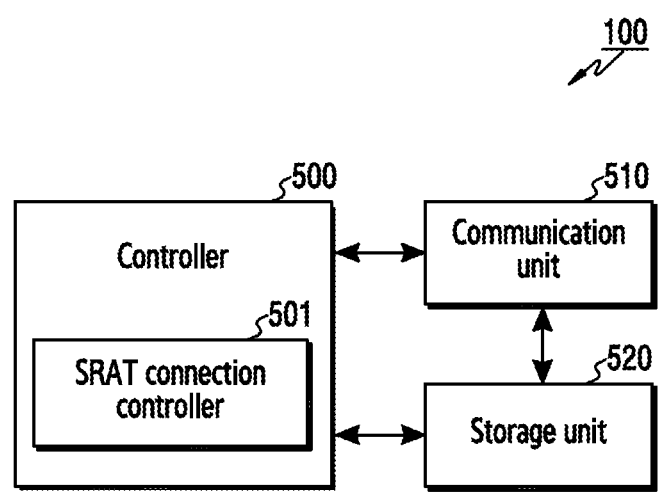
FIG. 5 is a block diagram of a first BS (first BS) according to an embodiment of the present disclosure.

FIG. 5 is a block diagram of a first BS according to an embodiment of the present disclosure.

Referring to FIG. 5, the first BS 100 may include a controller 500, a communication unit 510, and a storage unit 520.

The controller 500 controls and processes an overall operation of the terminal 110. The controller 500 may include at least one processor. The controller 500 may include an SRAT connection controller 501.

According to an exemplary embodiment, the SRAT connection controller 501 determines whether an S-RAT connection of the terminal 110 is necessary on the basis of information regarding a communication requirement of the terminal 110 and received from the terminal 110 via the communication unit 510. Herein, the information regarding the communication requirement may include information indicating whether an S-RAT connection of the terminal is necessary. Further, the information regarding the communication requirement may include information of a bandwidth or a latency of the terminal 110. For example, if a result of analyzing the information for the communication requirement of the terminal shows that the terminal 110 requires a high bandwidth, the SRAT connection controller 501 may determine that the S-RAT connection of the terminal 110 is necessary. For another example, if the result of analyzing the information regarding the communication requirement of the terminal shows that the terminal 110 requires a low bandwidth, the SRAT connection controller 501 may determine that the S-RAT connection of the terminal 110 is not necessary. Further, the SRAT connection controller 501 may determine whether the S-RAT connection of the terminal 110 is necessary by using the information regarding the communication requirement of the terminal 110 together with radio resource information. Herein, the radio resource information may include load information of the first BS 100 and load information of each of neighboring second BSs. Further, the radio resource information may include channel state information between the terminal 110 and the first BS 100 and channel state information between the terminal 110 and the second BS 102. Upon determining that the S-RAT connection of the terminal 110 is necessary, the SRAT connection controller 501 may transmit an S-RAT measurement configuration message to the terminal 110 via the communication unit 510.

According to another embodiment, the SRAT connection controller 501 may determine a trigger condition for an S-RAT measurement event for the terminal 110, and may transmit an S-RAT measurement configuration message including the trigger condition to the terminal 110 through the communication unit 510. For example, when a communication requirement of the terminal 110 satisfies a specific condition, the SRAT connection controller 501 may transmit to the terminal 110 the trigger condition for allowing the terminal 110 to perform the S-RAT measurement.

If the S-RAT measurement report message is received from the terminal 110, the SRAT connection controller 501 determines whether an S-RAT connection with the terminal 110 is necessary on the basis of the received measurement report message, radio resource information, and buffer status information of the terminal. Herein, the buffer status information of the terminal may include buffer status information (e.g., a queue length) for downlink data of the terminal 110 and buffer status information for uplink data of the terminal 110. Herein, the buffer status information for the uplink data of the terminal 110 may be acquired from a buffer status report received from the terminal 110. For example, the SRAT connection controller 501 may determine that the S-RAT connection with the terminal 110 is necessary when signal strength of the second BS 102, which is measured by the terminal 110, is greater than or equal to a threshold, a load of the second BS 102 is less than a threshold, and downlink buffer status information and uplink buffer status information are greater than or equal to a threshold. On the other hand, the SRAT connection controller 501 may determine that the S-RAT connection with the terminal 110 is necessary when signal strength of the second BS 102, which is measured by the terminal 110, is greater than or equal to a threshold but a load of the second BS 102 is greater than a threshold and downlink buffer status information and uplink buffer status information are less than a threshold. The SRAT connection controller 501 may transmit a signal indicating the S-RAT connection to at least one of the terminal 110 and a corresponding second BS when it is determined that the S-RAT connection is necessary on the basis of the measurement report message received from the terminal 110.

The communication unit 510 communicates with the terminal and communicates with neighboring second BSs under the control of the controller 500. The communication unit 510 may transmit/receive a signal with respect to the terminal 110 through a communication module for supporting an M-RAT. Further, the communication unit 510 may transmit/receive a signal with respect to the neighboring second BSs through a backhaul.

According to an embodiment, the communication unit 510 may provide the controller 500 with information regarding a communication requirement received from the terminal 110. Further, the communication unit 510 may transmit to the terminal 110 an S-RAT measurement configuration message including an event trigger condition under the control of the controller 500. Furthermore, the communication unit 510 may provide the controller 500 with the measurement report message received from the terminal 110.

The storage unit 520 stores a basic program, an application program, and a variety of data for an overall operation of the first BS 100. The storage unit 520 may store a variety of information required to determine whether the terminal 110 requires the S-RAT connection. For example, the storage unit 520 may store a trigger condition for the S-RAT measurement event, and may store information for the communication requirement received from the terminal 110. Further, the storage unit 520 may include a buffer for temporarily storing downlink data to be transmitted to the terminal. Furthermore, the storage unit 520 may store a threshold for downlink buffer status information and uplink buffer status information for the terminal 110. Furthermore, the storage unit 520 may store second BS load information received from the second BS 102 and first BS load information.

Figure 6:
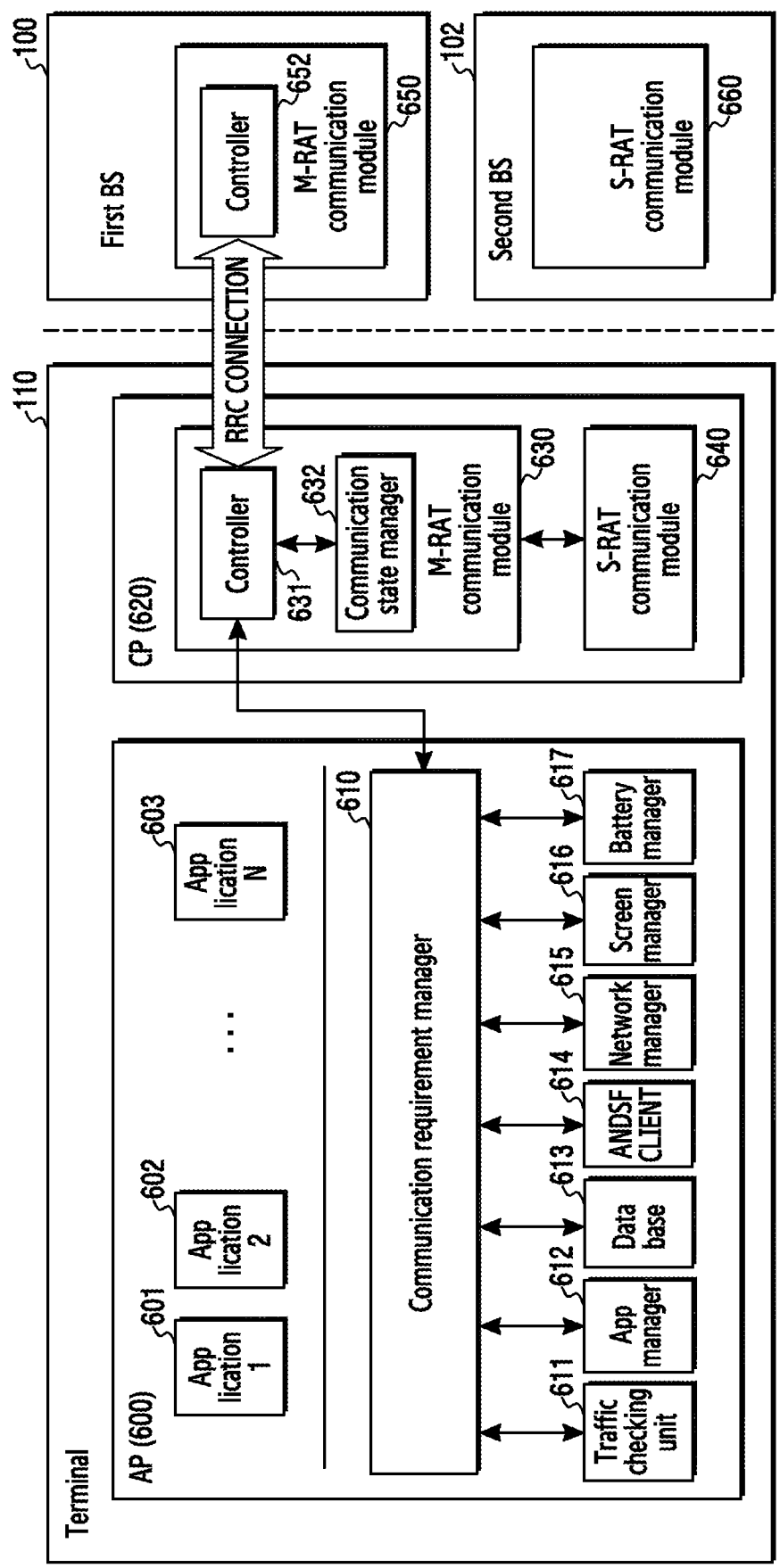
FIG. 6 is a block diagram illustrating a terminal and a first BS according to an embodiment of the present disclosure.

FIG. 6 is a block diagram illustrating a terminal and a first BS according to an embodiment of the present disclosure. Although only hardware and software modules (or functional blocks) closely related to an embodiment of the present disclosure are shown herein, even if the modules are typically included in the terminal and the first BS, constitutional elements which are not directly related to an embodiment are omitted.

Referring to FIG. 6, the terminal 110 may include an application processor (AP) 600 and a communication processor (CP) 620. According to an embodiment, the AP 600 and the CP 620 may be included in one integrated chip such as a system on chip (SoC). For example, the SoC may include a central processing unit (CPU), a graphic processing unit (GPU), and the CP 620. Herein, the CPU and the GPU may correspond to the AP 600. The AP 600 may be a device which serves for a control of an overall function of the terminal, and the CP 620 may be a device which serves for communication of the terminal. For example, from a perspective of a SoftWare (SW) architecture of a mobile communication terminal, such as a smart phone, an operation system (OS) such as Android, iOS, Linux, or Windows, may be operated by the AP.

The AP 600 may include a plurality of applications 601, 602, and 603, a communication requirement manager 610, a traffic checking unit 611, an app manager 612, a database 613, an access network discovery and selection function (ANDSF) client 614, a network manager 615, a screen manager 616, and a battery manager 617. The aforementioned constitutional elements 610 to 617 are classified by considering functional operations performed by the AP 600, and each of the constitutional elements may be configured in a combined manner.

The AP 600 controls the running of an application according to a user input, and confirms a communication requirement of an application running on an OS through the communication requirement manager 610. The AP 600 delivers the confirmed communication requirement to a controller 631 of the CP 620. For example, the communication requirement manager 610 may transmit/receive information required to confirm the communication requirement with respect to at least one constitutional element among the traffic checking unit 611, the app manager 612, the database 613, the ANDSF client 614, the network manager 615, the screen manager 616, and the battery manager 617.

According to an embodiment, the communication requirement manager 610 may provide the traffic checking unit 611 with information (e.g., an application identifier) regarding a currently running application, and may receive information regarding a data transfer rate required by the currently running application from the traffic checking unit 611.

According to an embodiment, the communication requirement manager 610 may acquire screen direction information of the terminal from the screen manager 616, and may acquire information regarding the communication requirement on the basis of the acquired screen direction information. For example, if a screen direction of the terminal is portrait, the AP 600 displays an image of a relatively low resolution in comparison with a case where the screen direction of the terminal is landscape. Therefore, the communication requirement manager 610 may acquire information regarding the communication requirement on the basis of the screen direction of the terminal.

According to an embodiment, the communication requirement manager 610 may request the app manager 612 to provide a unique identifier (e.g., a package name of an Android OS) of the currently running application, and may receive the unique identifier of the currently running application from the app manager 612. The communication requirement manager 610 may acquire information regarding a communication requirement corresponding to a unique identifier of a corresponding application from the database 613 by using the unique application of the application as a key. For example, the communication requirement manager 610 may receive "com.samsung.radio" as the unique identifier of the currently running application from the app manager 612, and may acquire that a communication requirement of the application of which the unique identifier is "com.samsung.radio" is a bandwidth of 192 Mbps from the database 613. For another example, the communication requirement manager 610 may receive "com.samsung.milkvr" as the unique identifier of the currently running application from the app manager 612, and may acquire that a communication requirement of the application of which the unique identifier is "com.samsung.milkvr" is a bandwidth of 32 Mbps from the database 613.

According to an embodiment, the communication requirement manager 610 receives RAT information per IP flow based on a policy of a mobile communication operator from the ANDSF client 614, and receives information of a currently activated IP flow from the network manager 615. The communication requirement manager 610 confirms RAT information of the currently activated IP flow on the basis of the RAT information per IP flow based on policy of the mobile communication operator. The communication requirement manager 610 may determine whether the terminal requires a current S-RAT connection on the basis of the RAT information of the currently activated IP flow. Herein, the operator policy may include an inter-system routing policy (ISRP) rule indicating RAT information per IP flow depending on a location and a time. The IP flow may be specified by combining a source IP address, a destination IP address, a protocol type, a source port number, a destination port number, or the like. For example, the communication requirement manager 610 may inquire the ANDSF client 614 about an operator policy at a current time and location, and may acquire RAT priority information regarding each IP flow from the ANDSF client 614 at the current time and the current location. Herein, an RAT priority for the IP flow may be information indicating a preferred RAT for each IP flow at the current time and the current location. Therefore, the communication requirement manager 610 may determine whether the preferred RAT for the currently activated IP flow is an S-RAT on the basis of the RAT priority information regarding the IP flow.

According to an embodiment, the communication requirement manager 610 receives from the battery manager 617 information regarding a battery level and whether a battery is charged. Herein, the battery level may be information indicating a remaining amount of the battery step-by-step. The communication requirement manager 610 may determine whether the S-RAT connection is necessary on the basis of the battery level and whether the battery is changed. For example, if the battery level is less than or equal to a reference level, the communication requirement manager 610 may determine that the S-RAT connection is not necessary. That is, even if different information (e.g., a required bandwidth of an application, a preferred RAT of an IP flow based on an operator policy, or the like) indicates that the S-RAT connection is necessary, if the battery level is less than or equal to a threshold level, the communication requirement manager 610 may determine that the S-RAT connection is not necessary to manage power of the terminal. On the other hand, if the battery level is greater than the reference level, the communication requirement manager 610 may determine whether the S-RAT connection is necessary on the basis of the different information. For another example, if the battery is in a charging state, the communication requirement manager 610 may determine that the S-RAT connection is necessary irrespective of the battery level. Further, if the battery is in the charging state, the communication requirement manager 610 may determine whether the S-RAT connection is necessary on the basis of the different information.

Figure 7A:
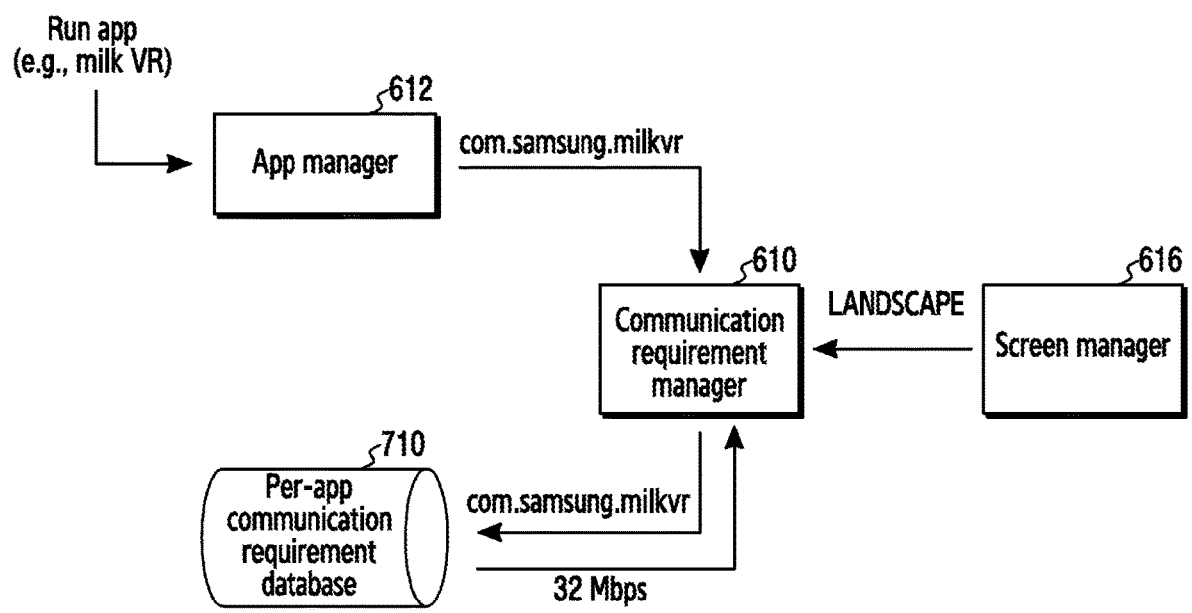
FIGS. 7A, 7B, and 7C illustrate examples of collecting a communication requirement in a terminal according to various embodiments of the present disclosure.
Figure 7B:
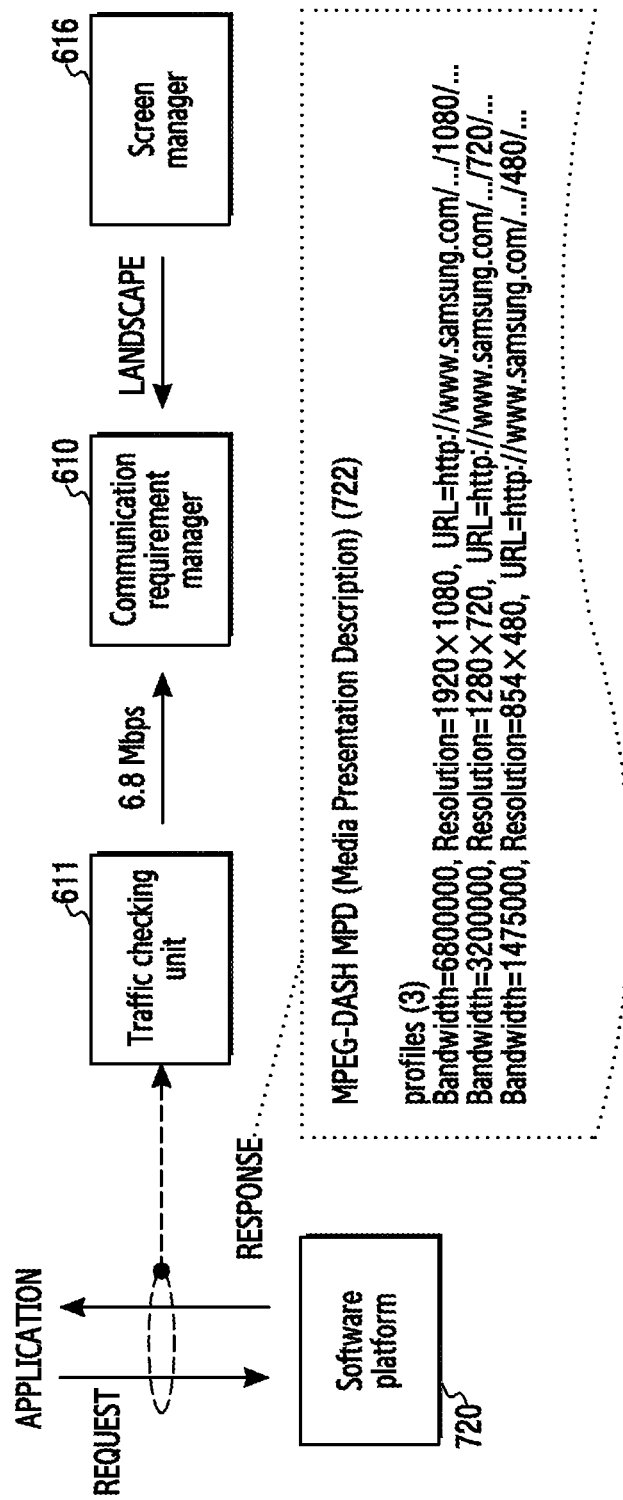
Figure 7C:
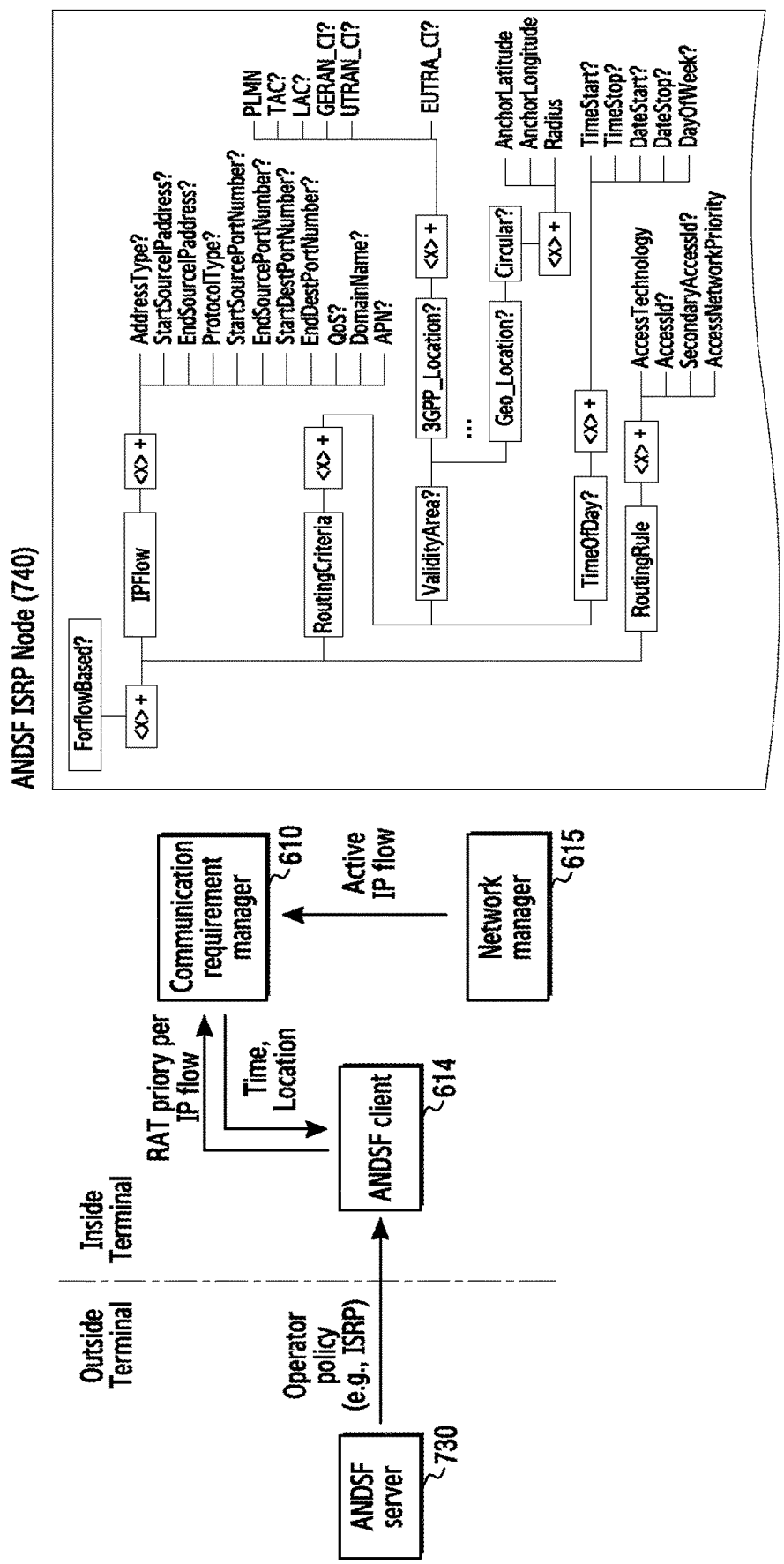

The traffic checking unit 611 may receive information regarding an application running on a current OS from the communication requirement manager 610, and may monitor traffic of the application on the basis of the received application to confirm a data transfer rate required by the application. For example, the traffic checking unit 611 may be implemented on a software platform (e.g., an Android framework), and may acquire information regarding the data transfer rate required by the application by monitoring user traffic transmitted/received by the application without having to change the existing application. For example, if a video playback is requested by a user input in a state where a 1$^{st}$ application of an HTTP video streaming type is running, the AP 600 may transmit to a video server (not shown) a file request message (e.g., a variant playlist file request message) including information regarding video on the basis of an HTTP GET message at the request of the 1$^{st}$ application. Accordingly, the AP 600 may receive an HTTP response message including an information file (e.g., variant playlist) regarding video from the video server. The information file regarding video includes image quality information (e.g., a bandwidth, a resolution, etc.) of the video requested to be played back. In general, the AP 600 requests a server to provide a video chunk with image quality corresponding to a channel state at the request of the 1$^{st}$ application, receives the video chunk of the image quality from the server, and thereafter plays back the received video chunk. Herein, the AP 600 may receive the video chunk of the image quality by transmitting to the video server the HTTP GET message including a requested video chunk number and image quality information. Therefore, the traffic checking unit 611 of the AP 600 may monitor traffic transmitted/received by the running application to acquire image quality information of video from the aforementioned HTTP messages. For example, as shown in FIGS. 7A to 7C, the traffic checking unit 611 may acquire an MPEG-DASH media presentation description (MPD) file 722 from an HTTP response message, and may confirm that a maximum bandwidth of video is 6860000 from the acquired MPEG-DASH MPD file 722, and thus may recognize that a required bandwidth of a corresponding application is up to 6.86

Mbps. The traffic checking unit 611 may periodically report the acquired communication requirement to the communication requirement manager 610 by monitoring traffic of the running application. Further, the traffic checking unit 611 may check whether the communication requirement of the running application is changed, and if the communication requirement is changed, may report the changed communication requirement to the communication requirement manager 610.

The app manager 612 detects whether an application starts to run, and if it is detected that a specific application starts to run, provides a unique identifier of the running specific application to the communication requirement manager 610. According to an embodiment, the app manager 612 may be requested to provide the unique identifier of the currently running application from the communication requirement manager 610, and may provide the unique identifier of the currently running application in response to the request. According to another embodiment, the app manager 612 may detect that a new application runs in a foreground without an explicit request from the communication requirement manager 610, and may deliver the unique identifier of the detected application to the communication requirement manager 610.

The database 613 may store a unique identifier of an application and information regarding a communication requirement through mapping for each application included in the AP 600. As illustrated, the database 613 may be included in an external portion of the communication requirement manager 610, and may be included in the communication requirement manager 610. Further, the database 613 may also be included in a separate memory coupled to the AP 600. The database 613 may receive from the communication requirement manager 610 a message for inquiring the communication requirement corresponding to the unique identifier of the application, and may provide the communication requirement manager 610 with the communication requirement corresponding to the unique identifier of the application.

The ANDSF client 614 may receive the policy of the mobile communication operator from an ANDSF server (not shown). Herein, an ANDSF is a mechanism for delivering the operator policy used when the terminal discovers and selects a neighboring access network from mobile communication networks. For example, the ANDSF client may acquire an ISRP rule indicating RAT information of an IP flow based on a location and a time from the ANDSF server.

The network manager 615 may acquire information of a currently activated IP flow. The network manager 615 may provide the communication requirement manager 610 with the information of the activated IP flow.

If information regarding the screen direction is requested from the communication requirement manager 610, the screen manager 616 may detect the screen direction of the terminal and may provide the communication requirement manager 610 with information of the detected screen direction. Further, if it is detected that the screen direction of the terminal is changed, the screen manager 616 may transmit information regarding the changed screen direction to the communication requirement manager 610 without a request of the communication requirement manager 610.

The battery manager 617 detects a remaining amount of a battery and whether the battery is changed. The battery manager 617 may provide the communication requirement manager 610 with the remaining amount of the battery and whether the battery is charged, in response to the request from the communication requirement manager 610. Further, if a battery level is changed or a battery charging state is changed, the battery manager 617 may provide the communication requirement manager 610 with the changed level or state.

The CP 620 may include an M-RAT communication module 630 and one or more S-RAT communication modules 640. The CP 620 acquires a communication requirement based on a running application from the AP 600, and determines whether to perform an S-RAT measurement on the basis of the acquired communication requirement. In particular, the CP 620 may provide an on/off control of the S-RAT communication module 640 on the basis of the acquired communication requirement.

The M-RAT communication module 630 may include the controller 631 and a communication state manager 632. The controller 631 of the M-RAT communication module 630 controls a function for performing communication with the first BS 100. Further, the controller 631 may provide an on/off control of the S-RAT communication module 640 on the basis of a communication requirement acquired from the communication requirement manager 610. The communication state manager 632 of the M-RAT communication module 630 controls and manages an on/off state of the S-RAT under the control of the controller 631. For example, if the acquired communication requirement indicates that an S-RAT connection is necessary, the controller 631 may provide the communication state manager 632 with a signal indicating that the S-RAT communication module 640 must operate in the on state, and the communication state manager 632 may control the S-RAT communication module 640 to operate in the on state. More specifically, if the S-RAT communication module 640 is in the off state, the communication state manager 632 may provide control such that the S-RAT communication module 640 transitions to the on state. Further, if the S-RAT communication module 640 is in the on state, the communication state manager 632 may provide control such that the S-RAT communication module 640 maintains the on state. Further, if the acquired communication requirement indicates that the S-RAT connection is not necessary, the controller 631 may provide the communication state manager 632 with a signal indicating that the S-RAT communication module 640 must operate in the off state, and the communication state manager 632 may provide control such that the S-RAT communication module 640 operates in the off state. More specifically, if the S-RAT communication module 640 is in the off state, the communication state manager 632 may provide control such that the S-RAT communication module 640 maintains the off state. Further, if the S-RAT communication module 640 is in the on state, the communication state manager 632 may provide control such that the S-RAT communication module 640 transitions to the off state.

Further, the controller 631 may receive an S-RAT measurement result from the S-RAT communication module 640 through the communication state manager 632, and may determine whether to perform an S-RAT measurement report on the basis of the S-RAT measurement result. In this case, the controller 631 may confirm a condition for a measurement report from a measurement configuration message received from the first BS 100. If the S-RAT measurement result satisfies the condition for the measurement report condition, the controller 631 may transmit an S-RAT measurement report message indicating the S-RAT measurement result to the first BS 100 through the M-RAT communication module 630.

The S-RAT communication module 640 is on/off according to a decision of the controller 631 included in the M-RAT communication module 630. The S-RAT communication module 640 in the on state may receive a reference signal which is periodically broadcast from a second BS, and may measure strength of the received signal. The S-RAT communication module 640 provides the M-RAT communication module 630 with an S-RAT measurement result indicating the measured signal reception strength.

In the above description, an operation performed by subordinate constitutional elements of the CP 620 may be understood as an operation performed by the CP 620. In other words, constitutional elements of the CP 620 defined in the present document are classified for convenience of explanations, and thus it is apparent that an operation of each of the constitutional elements can be performed by the CP 620. Further, a structure of the terminal according to an embodiment of the present disclosure is not limited to the aforementioned constitutional elements.

In addition, an M-RAT communication module 650 of the first BS 100 communicates with the M-RAT communication module 630 of the terminal 110. A controller 652 of the M-RAT communication module 650 may provide control such that an S-RAT measurement configuration message for requesting an S-RAT measurement is transmitted to the terminal 110. According to an embodiment, the S-RAT measurement configuration message may include an event trigger condition for allowing the terminal 110 to perform the S-RAT measurement. Herein, the event trigger condition may be a condition regarding a communication requirement. According to another embodiment, the controller 652 may determine whether the communication requirement received from the terminal 110 satisfies the event trigger condition, and if the communication requirement satisfies the event trigger condition, may transmit the S-RAT measurement configuration message to the terminal 110. Further, the controller 652 may determine whether the terminal 110 is connected with the second BS 102 on the basis of the S-RAT measurement report message received from the terminal 110. In this case, the controller 652 may determine whether the terminal 110 is connected with the second BS 102 by considering a buffer status indicating an amount of downlink data to be transmitted from the first BS 100 to the terminal 110, a buffer status indicating an amount of uplink data of the terminal 110, and cell load information of the second BS 102. The controller 652 may receive the cell load information through an X2 interface from the second BS 102.

An S-RAT communication module 660 of the second BS 102 communicates with the S-RAT communication module 640 of the terminal 110. The second BS 102 periodically broadcasts a reference signal through the S-RAT communication module 660. Further, the second BS 102 may transmit the cell load information through the X2 interface.

FIGS. 7A, 7B, and 7C illustrate examples of collecting a communication requirement in a terminal according to various embodiments of the present disclosure. Herein, examples in which the terminal 110 collects the communication requirement are described in detail on the basis of the aforementioned constitutional elements of FIG. 6.

FIG. 7A illustrates an example of collecting a communication requirement in a terminal on the basis of app information according to an embodiment of the present disclosure.

Referring to FIG. 7A, a milk VR app which is a video streaming service may run in the terminal 110 according to a user input. In this case, the app manager 612 notifies "com.samsung.milkvr" which is a unique identifier of a running specific app to the communication requirement manager 610. The communication requirement manager 610 may inquire a per-app communication requirement database 710 about a communication requirement corresponding to "com.samsung.milkvr" which is the unique identifier of the app, and thus may acquire information indicating that a required bandwidth of the milk VR app is 32 Mbps. Herein, the per-app communication requirement database 710 may be included in the database 613 of FIG. 6.

In addition, the communication requirement manager 610 may acquire current screen direction information of the terminal from the screen manager 616, and may determine a communication requirement by additionally considering the acquired screen direction information. For example, if an application which is running in a state where a screen direction is portrait is an application of an HTTP video stream type, the terminal 110 may display an image of a low resolution in comparison with a case where the screen direction is landscape. Therefore, the communication requirement manager 610 may determine the communication requirement by additionally considering the screen direction. For example, the communication requirement manager 610 inquires the per-app communication requirement database 710 about a communication requirement corresponding to the current screen direction together with the unique identifier of the app, and thus may acquire information regarding a bandwidth required by an app currently running in the current screen direction.

According to another embodiment, if the communication requirement of the app is specified in attribute information of the app, the communication requirement manager 610 may acquire the communication requirement of the app currently running in a foreground from the app manager 612 without the inquiry to the per-app communication requirement database 710.

FIG. 7B illustrates an example of collecting a communication requirement in a terminal by monitoring traffic according to an embodiment of the present disclosure.

Referring to FIG. 7B, the traffic checking unit 611 acquires information regarding a data transfer rate required by a corresponding application by monitoring a request signal and/or response signal transmitted/received by the application on a software platform 720. For example, if a video playback is requested by a user input in a state where a $1^{st}$ application of an HTTP video streaming type is running, the terminal 110 may transmit to a video server (not shown) a file request message (e.g., a variant playlist file request message) including information regarding video on the basis of an HTTP GET message at the request of the $1^{st}$ application, and may receive an HTTP response message including an information file (e.g., variant playlist) regarding video from the video server. In this case, the traffic checking unit 611 may acquire the MPEG-DASH MPD file 722 from an HTTP response message. The traffic checking unit 611 may recognize that there are an image having a bandwidth of 6860000 and a resolution of 1920×1080, an image having a bandwidth of 3200000 and a resolution of 1280×720, and an image having a bandwidth of 1475000 and a resolution of 854×480, and may confirm that a maximum bandwidth of video is 6860000 from the acquired MPEG-DASH MPD file 722. The traffic checking unit 611 may report to the communication requirement manager 610 about information indicating that a required bandwidth of a corresponding application is up to 6.86 Mbps. The communication requirement manager 610 may acquire information indicating that the required bandwidth of the currently running application is 6.86 Mbps.

In addition, the communication requirement manager 610 may acquire current screen direction information of the terminal from the screen manager 616, and may determine a communication requirement by additionally considering the acquired screen direction information. For example, if an application which is running in a state where a screen direction is portrait is an application of an HTTP video stream type, the terminal 110 may display an image of a low resolution in comparison with a case where the screen direction is landscape. Therefore, the communication requirement manager 610 may determine the communication requirement by additionally considering the screen direction. For example, if the current screen direction is landscape in a state where the required bandwidth of the currently running application is 6.86 Mbps, the communication requirement manager 610 may recognize that the required bandwidth is 6.86 Mbps. On the other hand, if the current screen direction is portrait in a state where the required bandwidth of the currently running application is 6.86 Mbps, the communication requirement manager 610 may recognize that the required bandwidth is lower than 6.86 Mpbs by a threshold.

FIG. 7C illustrates an example of collecting a communication requirement in a terminal on the basis of an operator policy according to an embodiment of the present disclosure.

Referring to FIG. 7C, the communication requirement manager 610 acquires information of an IP flow currently in an active state from the network manager 615. Further, the communication requirement manager 610 acquires current time and location information. In this case, the current time and location information may be acquired through an additional constitutional element included in the terminal. The communication requirement manager 610 inquires the ANDSF client 614 about the operator policy corresponding to the current time and location. The ANDSF client 614 may receive in advance an operator policy 740 including an ISRP from an ANDSF server 730, and may acquire per-IP flow RAT priority information corresponding to the current time and location information on the basis of the operator policy received in advance. The ANDSF client 614 provides the communication requirement manager 610 with the per-IP flow RAT priority information corresponding to the current time and location information. Herein, the per-IP flow RAT priority information may indicate an RAT preferred by each IP flow at the current time and location.

The communication requirement manager 610 may confirm the RAT preferred by the IP flow currently in the active state, on the basis of the per-IP flow RAT priority information. The communication requirement manager 610 may generate information indicating that an S-RAT connection is required as a communication requirement if the preferred RAT of the IP flow currently in the active state is an S-RAT, and may generate information indicating that the S-RAT connection is not necessary as the communication requirement if the preferred RAT of the IP flow currently in the active state is an M-RAT.

Figure 8:
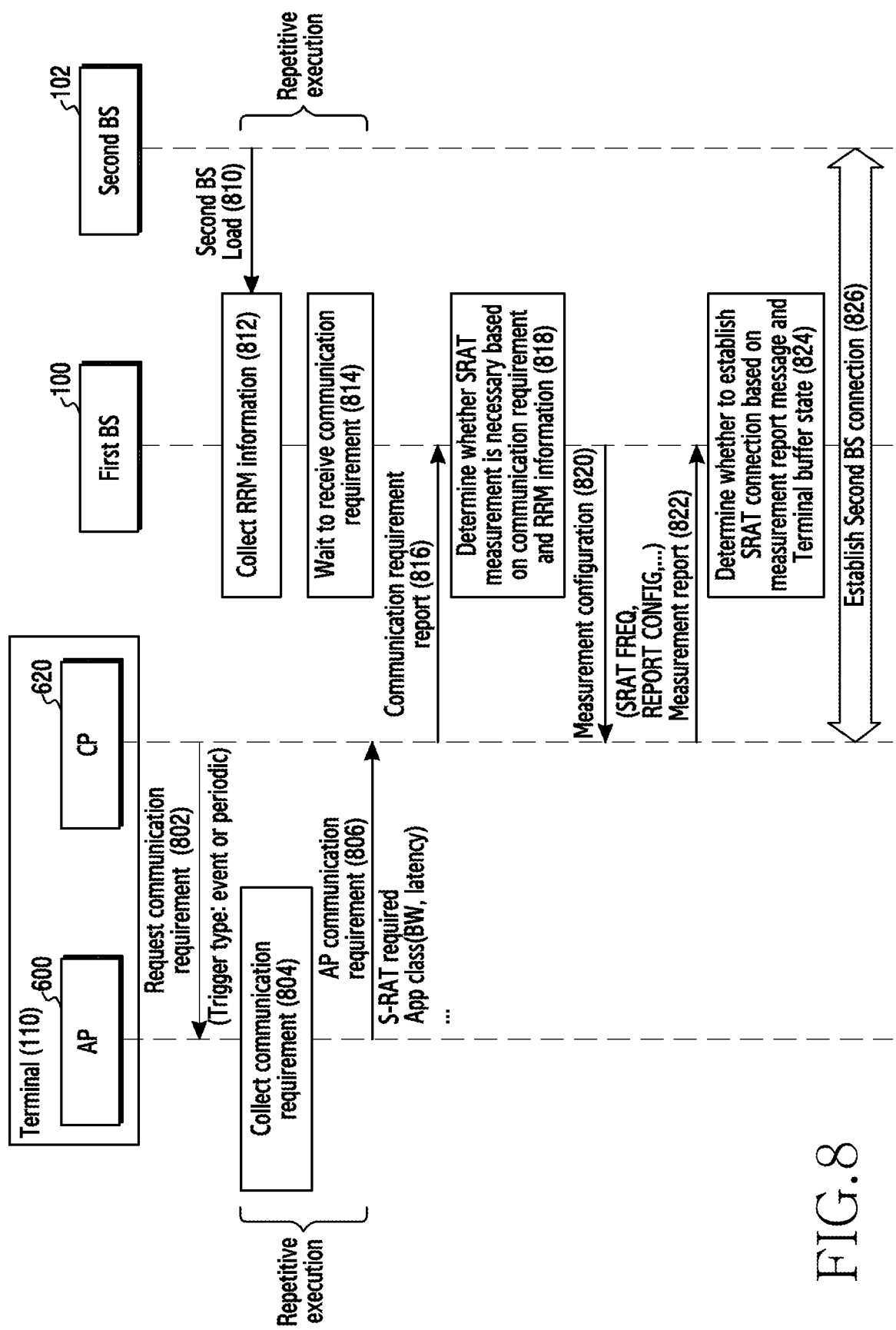
FIG. 8 illustrates a signaling procedure in which a terminal is connected with a second BS according to an embodiment of the present disclosure.

FIG. 8 illustrates a signaling procedure in which a terminal is connected with a second BS according to an embodiment of the present disclosure.

Referring to FIG. 8, in operation 802, the CP 620 of the terminal 110 transmits a communication requirement request message to the AP 600. In this case, the communication requirement request message may include information regarding a trigger type for delivering the communication requirement. For example, the communication requirement request message may include the trigger type information for allowing the AP 600 to periodically deliver the communication requirement or to deliver the communication requirement when an event of changing the communication requirement occurs. Further, the communication requirement message may include information regarding a type of an S-RAT, a condition required to determine whether the S-RAT is necessary, an app class classified based on a required bandwidth, an app class classified based on a latency, or the like.

Figure 11:
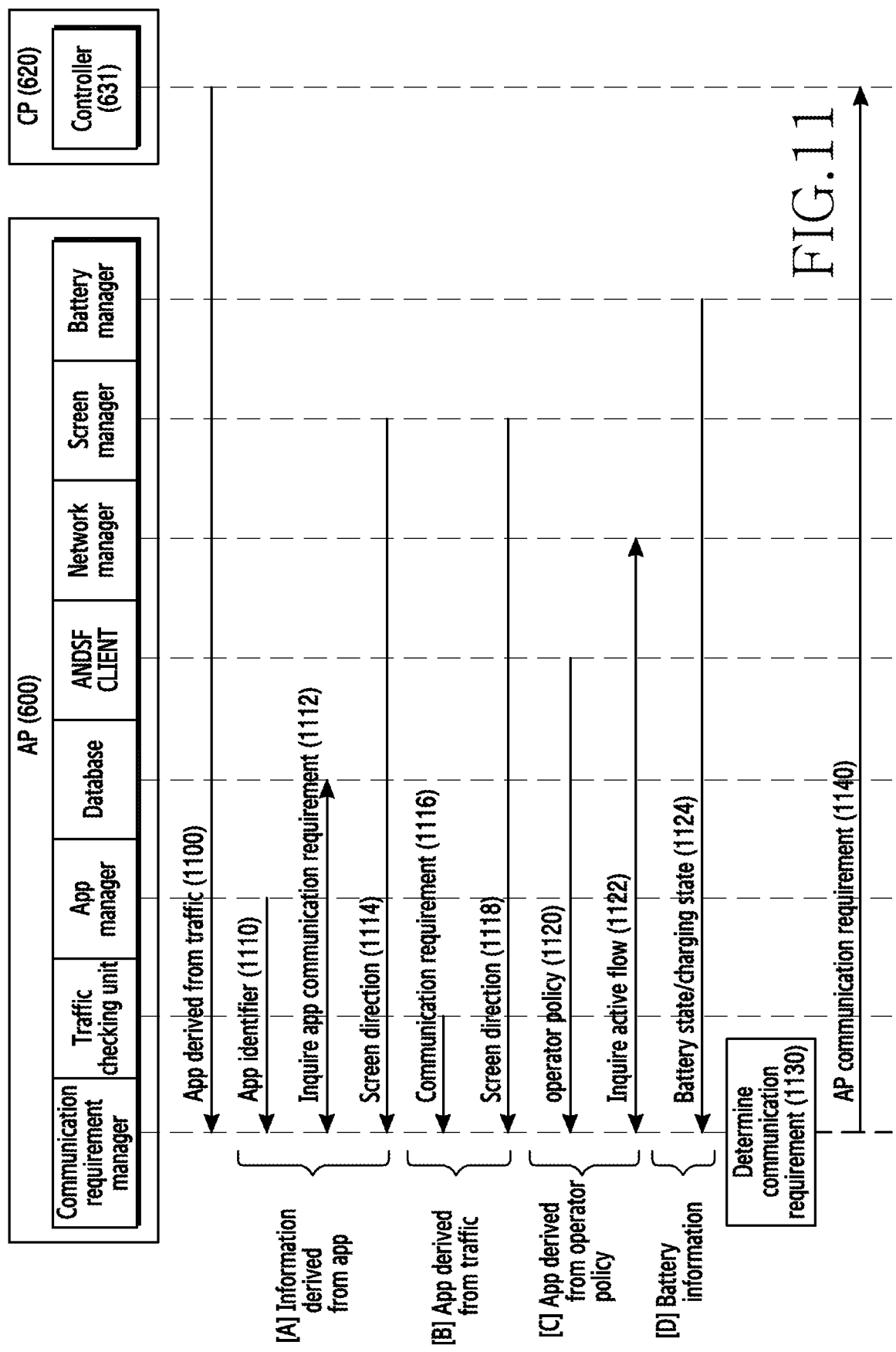
FIG. 11 illustrates a message flow for collecting a communication requirement in a terminal according to an embodiment of the present disclosure.

In operation 804, the AP 600 of the terminal 110 collects the communication requirement. For example, the AP 600 collects the communication requirement based on a running application. As shown in FIG. 11 according to an embodiment, the AP 600 may determine the communication requirement based on information derived from the application, may determine the communication requirement based on information derived from traffic, may determine the communication requirement based on information derived from an operator policy, or may determine the communication requirement based on battery information. Further, the AP 600 may determine the communication requirement by combining at least two pieces of the listed information.

In operation 806, the AP 600 of the terminal 110 provides the CP 620 with the communication requirement determined in the AP. According to an embodiment, the communication requirement determined in the AP may indicate whether the S-RAT is necessary as a value of true or false. Further, the communication requirement determined in the AP may directly specify a required bandwidth of the terminal 110 and a metric such as a latency or the like. Furthermore, the communication requirement determined in the AP may include information indirectly specifying an application class classified based on the required bandwidth of the terminal 110 and the latency. For example, the application class may indicate a level of a bandwidth required by an application running in the terminal 110, or a latency level.

In operation 816, the CP 620 transmits the communication requirement determined in the AP to the first BS 100. In this case, the CP 620 may transmit a message indicating the communication requirement to the first BS 100 through an MRAT communication module. Further, the message indicating the communication requirement may be transmitted by using an RRC message or may be transmitted by using a physical uplink control channel (PUCCH) or a MAC control element (CE).

Meanwhile, in operation 810, the first BS 100 receives cell load information of the second BS from the second BS 102. In this case, a cell load of the second BS is received through an X2 interface. Further, in operation 812, the first BS 100 collects radio resource management (RRM) information. For example, the first BS 100 collects the RRM information indicating cell load information of the first BS and cell load information of the second BS. Thereafter, in operation 814, the first BS 100 waits to receive the communication requirement from the terminal 110. For example, the first BS 100 may detect whether the communication requirement is received from the terminal 110 currently connected with the first BS 100 in a wireless manner. The first BS 100 may repeat the operations 810 to 814 until the message indicating the communication requirement is received from the terminal 110. Herein, the operations 810 to 814 may be performed in sequence or in parallel, and if the steps are performed in sequence, orders thereof may be changed.

After receiving the message indicating the communication requirement from the terminal 110, in operation 818, the first BS 100 determines whether an S-RAT measurement is necessary on the basis of radio resource management information and the communication requirement of the terminal. Herein, the radio resource information may include load information of the first BS 100, load information of each of neighboring second BSs, channel state information between the terminal 110 and the first BS 100, and channel state information between the terminal 110 and the second BS 102. For example, the first BS 100 may determine that the terminal 110 needs to perform the S-RAT measurement if the communication requirement information received from the terminal 110 indicates the necessity of the S-RAT as true, and may determine that the terminal 110 does not need to perform the S-RAT measurement if the communication requirement information received from the terminal 110 indicates that the necessity of the S-RAT as false. For another example, if the communication requirement information received from the terminal 110 directly indicates a bandwidth, a latency, or the like, or indicates a class regarding the bandwidth or the latency, the first BS 100 may determine whether the bandwidth or the latency can be supported using the M-RAT. In this case, if it is determined that the bandwidth or the latency cannot be supported using the M-RAT, the first BS 100 may determine that the terminal 110 needs to perform the S-RAT measurement. Further, if it is determined that the bandwidth or the latency can be supported using the M-RAT, the first BS 100 may determine that the terminal 110 does not need to perform the S-RAT measurement. For another example, irrespective of the communication requirement received from the terminal 110, the first BS 100 may determine that the terminal 110 needs to perform the S-RAT measurement for the purpose of solving a load imbalance of the first BS 100 and the second BS 102. That is, if a cell load of the first BS 100 is higher than a threshold and a cell load of the second BS 102 is lower than the threshold, the first BS 100 may determine that the terminal 110 needs to perform the S-RAT measurement in order to offload the load to the second BS 102.

If it is determined that the terminal 110 needs to perform the S-RAT measurement, the first BS 100 transmits a measurement configuration message to the terminal 110 to instruct a measurement of the S-RAT in operation 820. Herein, the measurement configuration message may be transmitted by using an RRC message. Further, the measurement configuration message may include information such as a frequency of the S-RAT to be measured by the terminal 110, a condition (e.g., a threshold) for reporting an S-RAT measurement result, a report period for the S-RAT, or the like. If the first BS 100 determines that the terminal 110 does not need to perform the S-RAT measurement, the first BS 100 may collect radio resource management information, and may perform again the operation of receiving the communication requirement of the terminal 110.

Upon receiving the measurement configuration message from the first BS 100, the terminal 110 changes the S-RAT communication module to an on state. Thereafter, the terminal 110 may receive a reference signal which is periodically broadcast from the second BS 102 supporting the S-RAT through the S-RAT communication module, and may measure reference signal reception strength. In operation 822, the terminal 110 transmits to the first BS 100 a measurement report message indicating the reference signal reception strength. Herein, the measurement report message may be an RRC message.

In operation 824, the first BS 100 finally determines whether the terminal 110 establishes the S-RAT connection on the basis of the measurement report message and a buffer status of the terminal. Herein, buffer status information of the terminal may include downlink buffer status information (e.g., a queue length) indicating a downlink data amount of the terminal 110 and uplink buffer status information indicating an uplink data amount of the terminal 110. Herein, the buffer status information for the uplink data of the terminal 110 may be acquired from a buffer status report received from the terminal 110. For example, the first BS 100 may determine that the S-RAT connection with the terminal 110 is necessary when signal strength of the second BS 102, which is measured by the terminal 110, is greater than or equal to a threshold, and a downlink data amount and uplink data amount for the terminal 110 are greater than or equal to a threshold. On the other hand, the first BS 100 may determine that the S-RAT connection with the terminal 110 is not necessary when signal strength of the second BS 102, which is measured by the terminal 110, is greater than or equal to a threshold but a downlink data amount and an uplink data amount are less than a threshold. Further, the first BS may determine whether the S-RAT connection with the terminal 110 is necessary by additionally considering a cell load of the second BS 102.

If it is determined that the connection between the terminal 110 and the second BS 102 is necessary, the first BS 100 may transmit a signal to at least one of the terminal 110 and the second BS 102 to instruct the S-RAT connection. Accordingly, in operation 826, the terminal 110 and the second BS 102 may establish a radio connection.

Figure 9:
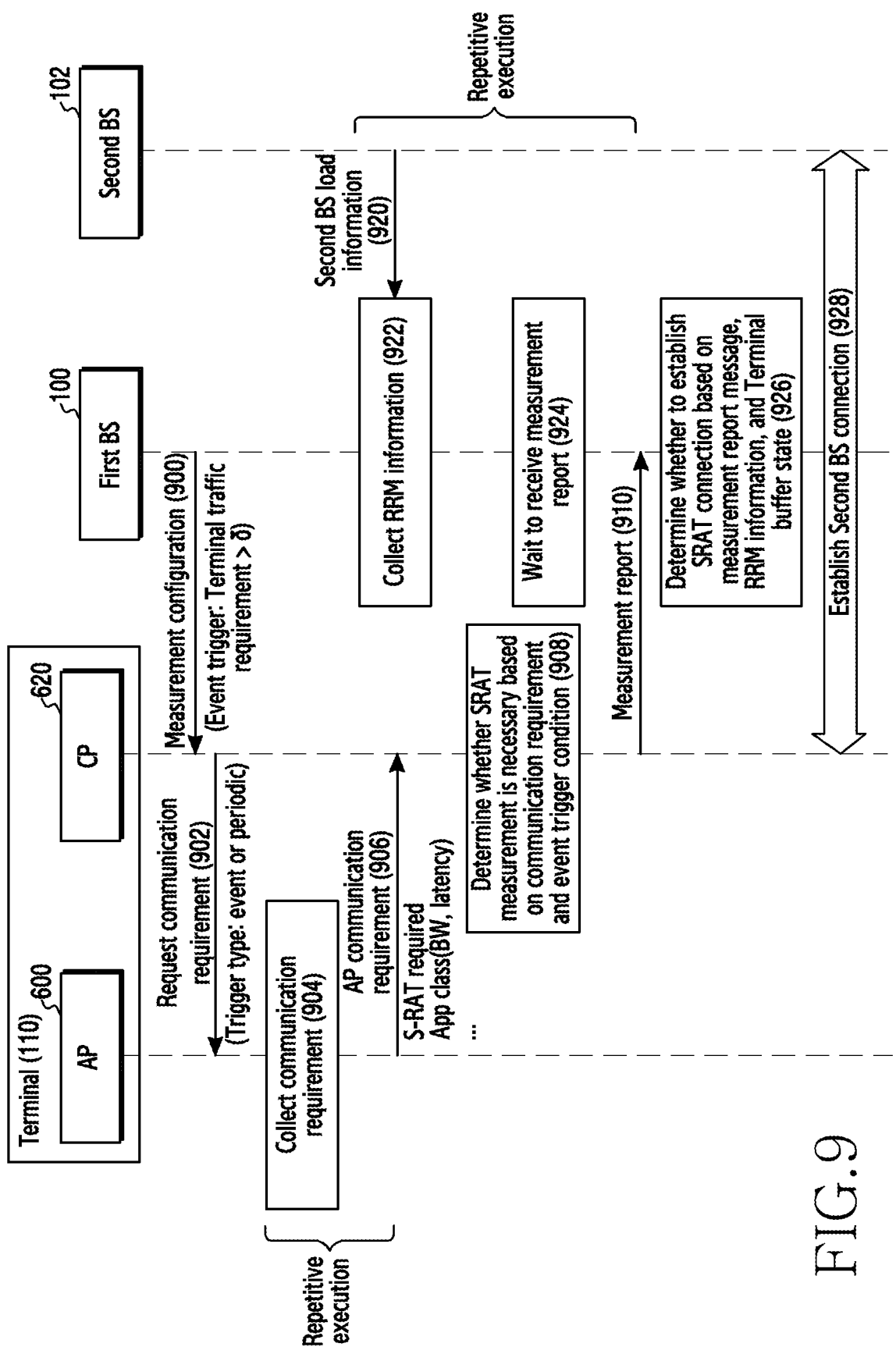
FIG. 9 illustrates a signaling procedure in which a terminal is connected with a second BS according to an embodiment of the present disclosure.

FIG. 9 illustrates a signaling procedure in which a terminal is connected with a second BS according to an embodiment of the present disclosure.

Referring to FIG. 9, in operation 900, the first BS 100 transmits a measurement configuration message to the terminal 110. Herein, the measurement configuration message may be an RRC message, and may include information such as a frequency of an S-RAT to be measured by the terminal 110, a condition (e.g., a threshold) for reporting an S-RAT measurement result, a report period for the measurement result, or the like. Further, according to an embodiment of the present disclosure, the measurement configuration message includes a trigger condition for an S-RAT measurement event of the terminal 110. For example, the measurement configuration message includes a condition for a communication requirement to be satisfied in order for the terminal 110 to perform the S-RAT measurement. More specifically, the measurement configuration message may include information indicating that the trigger condition for the S-RAT measurement event is "communication requirement>20 Mbps" so that the S-RAT measurement can start when the communication requirement of the terminal exceeds 20 Mbps. For another example, the measurement configuration message may include information indicating that the trigger condition for the S-RAT measurement event is "communication requirement>3 (app class)" so that the S-RAT measurement can start when the requirement bandwidth of the terminal is a level 3.

Upon receiving the measurement configuration message from the first BS 100, in operation 902, the CP 620 of the terminal 110 transmits a communication requirement request message to the AP 600. In this case, the communication requirement request message may include information regarding a trigger type for delivering the communication requirement. For example, the communication requirement request message may include the trigger type information for allowing the AP 600 to periodically deliver the communication requirement or to deliver the communication requirement when an event of changing the communication requirement occurs. Further, the communication requirement message may include information regarding a type of an S-RAT, a condition required to determine whether the S-RAT is necessary, an app class classified based on a required bandwidth, an app class classified based on a latency, or the like.

In operation 904, the AP 600 of the terminal 110 collects the communication requirement. For example, the AP 600 collects the communication requirement based on a running application. As shown in FIG. 11 according to an embodiment, the AP 600 may determine the communication requirement based on information derived from the application, may determine the communication requirement based on information derived from traffic, may determine the communication requirement based on information derived from an operator policy, or may determine the communication requirement based on battery information. Further, the AP 600 may determine the communication requirement by combining at least two pieces of the listed information.

In operation 906, the AP 600 of the terminal 110 provides the CP 620 with the communication requirement determined in the AP. According to an embodiment, the communication requirement determined in the AP may indicate whether the S-RAT is necessary as a value of true or false. Further, the communication requirement determined in the AP may directly specify a required bandwidth of the terminal 110 and a metric such as a latency or the like. Furthermore, the communication requirement determined in the AP may include information indirectly specifying an application class classified based on the required bandwidth of the terminal 110 and the latency. For example, the application class may indicate a level of a bandwidth required by an application running in the terminal 110, or a latency level.

In operation 908, the CP 620 determines whether the S-RAT measurement is necessary on the basis of an event trigger condition and the communication requirement determined in the AP 600. For example, the CP 620 determines whether the communication requirement received from the AP 600 satisfies a trigger condition for the S-RAT measurement event received from the first BS 100. If the communication requirement received from the AP 600 satisfies the trigger condition for the S-RAT measurement event received from the first BS 100, the CP 620 may determine that the terminal 110 needs to measure the S-RAT. On the other hand, if the communication requirement received from the AP 600 does not satisfy the trigger condition for the S-RAT measurement event received from the first BS 100, the CP 620 may determine that the terminal 110 does not need to perform the S-RAT measurement.

If it is determined that the terminal 110 needs to perform the S-RAT measurement, the CP 620 of the terminal 110 changes the S-RAT communication module to an on state. Thereafter, the CP 620 of the terminal 110 may receive a reference signal which is periodically broadcast from the second BS 102 supporting the S-RAT through the S-RAT communication module, and may measure reference signal reception strength. In operation 910, the CP 620 of the terminal 110 transmits to the first BS 100 a measurement report message indicating the reference signal reception strength. Herein, the measurement report message may be an RRC message.

Meanwhile, in operation 920, the first BS 100 receives cell load information of the second BS from the second BS 102. In this case, a cell load of the second BS is received through an X2 interface. Further, in operation 922, the first BS 100 collects RRM information. For example, the first BS 100 collects the RRM information indicating cell load information of the first BS and cell load information of the second BS. Thereafter, in operation 924, the first BS 100 waits to receive the communication requirement from the terminal 110. For example, the first BS 100 may detect whether the communication requirement is received from the terminal 110 currently connected with the first BS 100 in a wireless manner. The first BS 100 may repeat the operations 920 to 924 until the message indicating the communication requirement is received from the terminal 110. Herein, the operations 920 to 924 may be performed in sequence or in parallel, and if the steps are performed in sequence, orders thereof may be changed.

In operation 926, the first BS 100 finally determines whether the terminal 110 establishes the S-RAT connection on the basis of the measurement report message and a buffer status of the terminal. Herein, buffer status information of the terminal may include downlink buffer status information (e.g., a queue length) indicating a downlink data amount of the terminal 110 and uplink buffer status information indicating an uplink data amount of the terminal 110. Herein, the buffer status information for the uplink data of the terminal 110 may be acquired from a buffer status report received from the terminal 110. For example, the first BS 100 may determine that the S-RAT connection with the terminal 110 is necessary when signal strength of the second BS 102, which is measured by the terminal 110, is greater than or equal to a threshold, and a cell load of the second BS 102 is less than a threshold. For another example, the first BS 100 may determine that the S-RAT connection with the terminal 110 is necessary for the purpose of offloading the cell load of the first BS 100 when the cell load of the second BS 102 is less than a threshold load and the cell load of the first BS 100 is greater than a threshold load. For another example, the first BS 100 may determine that the S-RAT connection with the S-RAT is necessary when signal strength of the second BS 102, which is measured by the terminal 110, is greater than or equal to a threshold, and at least one of a downlink data amount and uplink data amount for the terminal 110 is greater than or equal to a threshold. For another example, the first BS 100 may determine that the S-RAT connection with the S-RAT is not necessary when signal strength of the second BS 102, which is measured by the terminal 110, is greater than or equal to a threshold, but a downlink data amount and an uplink data amount are less than a threshold.

If it is determined that the connection between the terminal 110 and the second BS 102 is necessary, the first BS 100 may transmit a signal to at least one of the terminal 110 and the second BS 102 to instruct the S-RAT connection. Accordingly, in operation 928, the terminal 110 and the second BS 102 may establish a radio connection.

Figure 10:
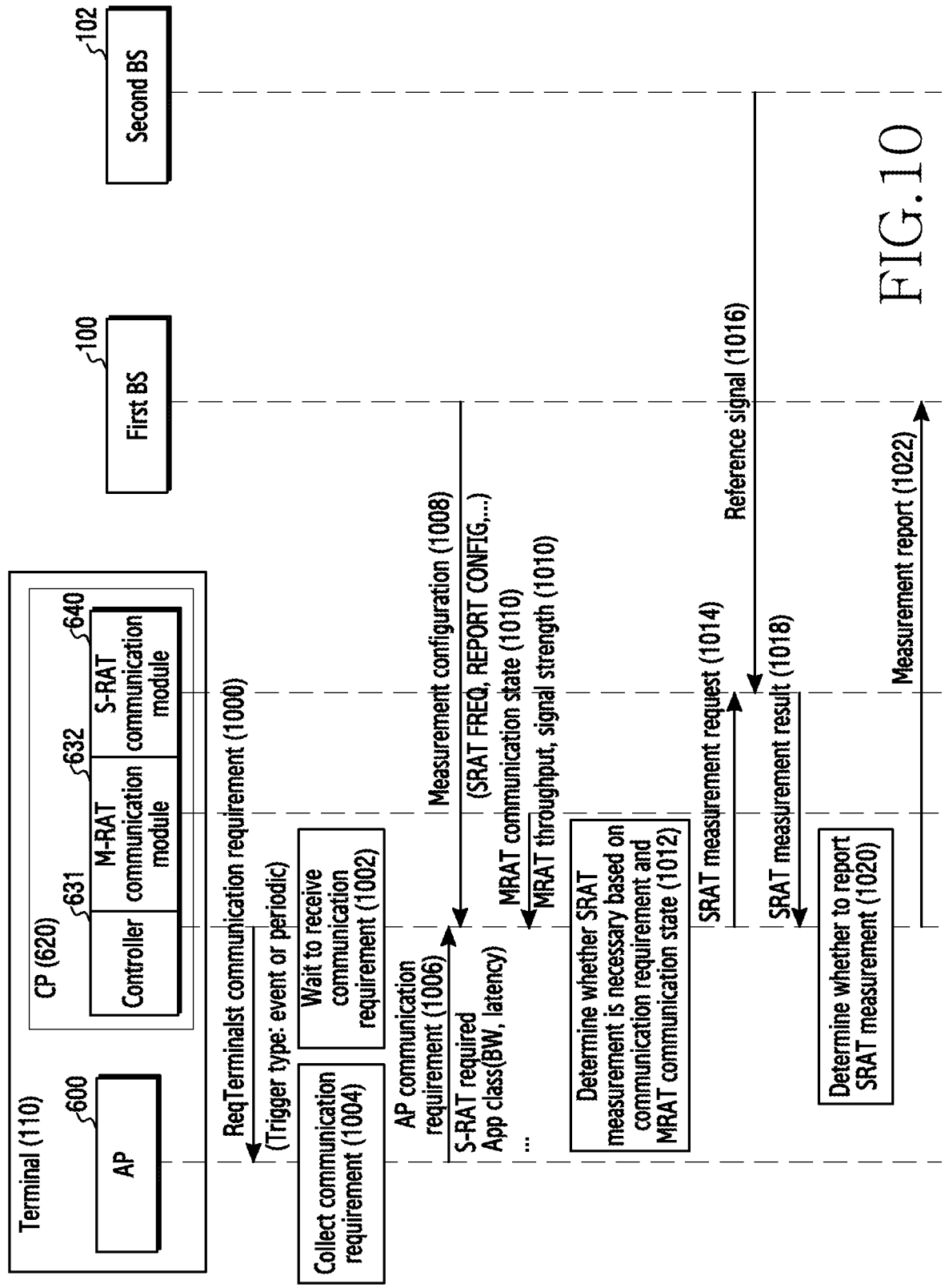
FIG. 10 illustrates a signaling procedure in which a terminal is connected with a second BS according to an embodiment of the present disclosure.

FIG. 10 illustrates a signaling procedure in which a terminal is connected with a second BS according to an embodiment of the present disclosure.

Referring to FIG. 10, in operation 1000, the CP 620 of the terminal 110 transmits a communication requirement request message to the AP 600. In this case, the communication requirement request message may include information regarding a trigger type for delivering the communication requirement. For example, the communication requirement request message may include the trigger type information for allowing the AP 600 to periodically deliver the communication requirement or to deliver the communication requirement when an event of changing the communication requirement occurs. Further, the communication requirement message may include information regarding a type of an S-RAT, a condition required to determine whether the S-RAT is necessary, an app class classified based on a required bandwidth, an app class classified based on a latency, or the like.

Thereafter, in operation 1002, the controller 631 of the CP 620 waits to receive the communication requirement from the AP 600.

In operation 1004, the AP 600 of the terminal 110 collects the communication requirement. For example, the AP 600 collects the communication requirement based on a running application. As shown in FIG. 11 according to an embodiment, the AP 600 may determine the communication requirement based on information derived from the application, may determine the communication requirement based on information derived from traffic, may determine the communication requirement based on information derived from an operator policy, or may determine the communication requirement based on battery information. Further, the AP 600 may determine the communication requirement by combining at least two pieces of the listed information.

In operation 1006, the AP 600 of the terminal 110 provides the CP 620 with the communication requirement determined in the AP. According to an embodiment, the communication requirement determined in the AP may indicate whether the S-RAT is necessary as a value of true or false. Further, the communication requirement determined in the AP may directly specify a required bandwidth of the terminal 110 and a metric such as a latency or the like. Furthermore, the communication requirement determined in the AP may include information indirectly specifying an application class classified based on the required bandwidth of the terminal 110 and the latency. For example, the application class may indicate a level of a bandwidth required by an application running in the terminal 110, or a latency level.

The controller 631 of the CP 620 collects the communication requirement in operation 1006, and receives a measurement configuration message from the first BS 100 in operation 1008. Herein, the measurement configuration message may be an RRC message. Further, the measurement configuration message may include information such as a frequency of the S-RAT to be measured by the terminal 110, a condition (e.g., a threshold) for reporting an S-RAT measurement result, a report period for the S-RAT, or the like.

Further, in operation 1010, the controller 631 of the CP 620 receives information indicating an M-RAT communication state from the M-RAT communication state manager 632. The information indicating the M-RAT communication state may include information such as a throughput of M-RAT measured for a specific time duration, signal strength of the M-RAT, or the like.

In operation 1012, the controller 631 of the CP 620 determines whether to perform the S-RAT measurement on the basis of the communication requirement and the M-RAT communication state. For example, the controller 631 of the CP 620 may determine whether to perform the S-RAT measurement on the basis of whether the M-RAT communication state acquired from the MRAT communication state manager 632 satisfies the communication requirement delivered from the AP 600. More specifically, if the throughput of M-RAT is 20 Mbps and the communication requirement is 32 Mbps, the throughput of M-RAT does not satisfy the communication requirement, and thus the controller 631 may determine that the S-RAT measurement is necessary. For another example, if signal strength of M-RAT is less than or equal to a threshold, the controller 631 may determine that the S-RAT measurement is necessary irrespective of the communication requirement. This is because, if the signal strength of M-RAT is less than or equal to the threshold, there is a high possibility that the terminal 110 is located at a cell boundary of the first BS 100.

If it is determined that the S-RAT measurement is necessary, in operation 1014, the controller 631 transmits to the S-RAT communication module 640 a signal for requesting the S-RAT measurement. Accordingly, the S-RAT communication module 640 transitions from an off state to an on state, and in operation 1016, receives a reference signal which is broadcast from the second BS 102 supporting an S-RAT. The S-RAT communication module 640 measures strength of the received reference signal, and in operation 1018, delivers to the controller 631 an S-RAT measurement result including the measured strength of the reference signal. Herein, the S-RAT measurement operation of the S-RAT communication module 640 may be repetitively performed if there is no additional indication from the controller 631. For example, the S-RAT communication module 640 may transition to the off state upon receiving from the controller 631 a signal indicating the transition to the off state. For example, if an M-RAT communication state satisfies a current communication requirement received from the AP 600, the S-RAT communication module 640 may transition to the off state by receiving from the controller 631 the signal indicating the transition to the off state.

In operation 1020, the controller 631 determines whether to perform an S-RAT measurement report. For example, if the measured S-RAT reference signal strength is less than or equal to a threshold for the S-RAT measurement report, the controller 631 may determine that the S-RAT measurement report is not performed, and if the measured S-RAT reference signal strength is greater than the threshold for the S-RAT measurement report, may determine that the S-RAT measurement report is performed. If it is determined that the S-RAT measurement report is performed, in operation 1022, the controller 631 may transmit to the first BS 100 a measurement report message for the S-RAT. Herein, the measurement report message may be an RRC message.

FIG. 11 illustrates a message flow for collecting a communication requirement in a terminal according to various embodiments of the present disclosure.

Referring to FIG. 11, in operation 1100, the AP 600 may receive a communication requirement request message from the controller 631 of the CP 620. In response thereto, the AP 600 may collect information for determining the communication requirement through signal transmission/reception with respect to several constitutional elements included in the AP 600 under the control of a communication requirement manager, and may determine the communication requirement on the basis of the collected information. For example, the AP 600 may determine the communication requirement based on information derived from the application, may determine the communication requirement based on information derived from traffic, may determine the communication requirement based on information derived from an operator policy, or may determine the communication requirement based on battery information. Further, the AP 600 may determine the communication requirement by combining at least two pieces of the listed information.

More specifically, according to an embodiment, the communication requirement manager of the AP 600 acquires an app identifier in operation 1110, and inquires a communication requirement of an app on the basis of the app identifier in operation 1112. Further, the communication requirement manager of the AP 600 may acquire a screen direction through a screen manager in operation 1114, and may determine a communication requirement on the basis of the screen direction and the communication requirement of the app in operation 1130.

According to another embodiment, the communication requirement manager of the AP 600 may collect the communication requirement by monitoring traffic in operation 1116, may collect the screen direction in operation 1118, and may determine the communication requirement on the basis of the collected communication requirement and screen direction in operation 1130.

According to another embodiment, the communication requirement manager of the AP 600 may acquire an operator policy in operation 1120, may inquire an activated flow in operation 1122, and thereafter may determine the communication requirement on the basis of the operator policy and the activated flow in operation 1130.

According to another embodiment, the communication requirement manager of the AP 600 may acquire battery state information and information regarding whether charging is performed in operation 1124, and may determine the communication requirement on the basis of the battery state information and whether the charging is achieved in operation 1130.

In operation 1140, the AP 600 may deliver the determined communication requirement to the controller 631. Herein, according to an embodiment, the steps of FIG. 11 may be performed in sequence, in parallel, and repetitively. Further, when a variety of information is collected to determine the communication requirement, a message and/or a signal are not necessarily exchanged between constitutional elements in the AP 600. For example, according to a design rule, the exchange of the message and/or the signal between the constitutional elements in the AP 600 may be omitted.

Hereinafter, FIG. 12 and FIG. 13 briefly illustrate an operating procedure in which the first BS 100 determines whether an S-RAT connection with the terminal 110 is necessary according to an embodiment.

Figure 12:
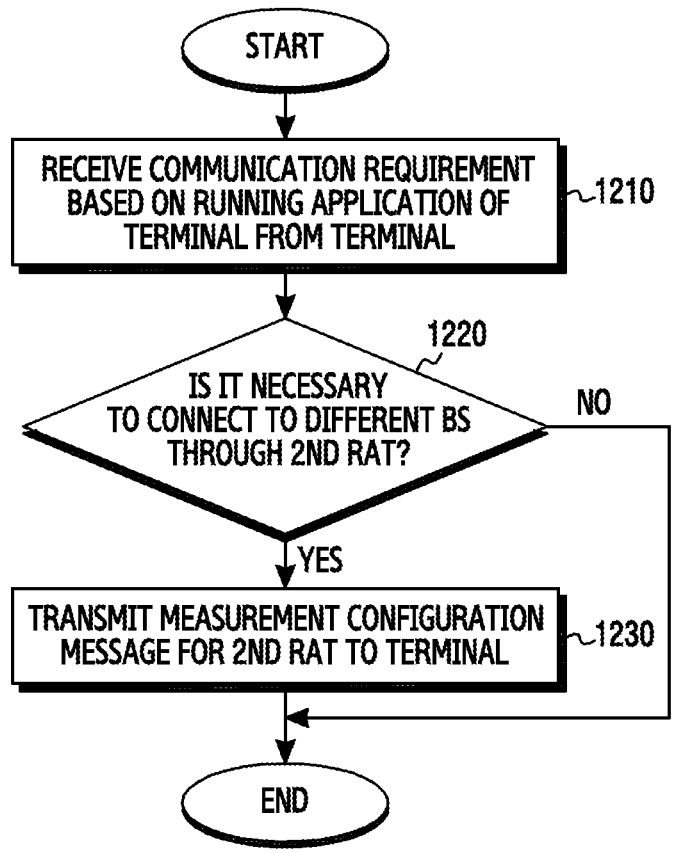
FIG. 12 illustrates an operating procedure of a first BS according to an embodiment of the present disclosure.

FIG. 12 illustrates an operating procedure of a first BS according to an embodiment of the present disclosure. Herein, it is assumed that the first BS supports a $1^{st}$ RAT, and is in a state where a radio connection with a terminal is established through the $1^{st}$ RAT.

Referring to FIG. 12, the first BS 100 receives communication requirement information from the terminal on the basis of a running application of the terminal in operation 1210. For example, the first BS 100 may receive a communication requirement including information regarding a bandwidth required in the terminal 110 or a required latency according to the running application of the terminal 110. For another example, the first BS 100 may receive the communication requirement indicating whether the terminal 110 requires the S-RAT connection according to the running application of the terminal 110.

In operation 1220, the first BS 100 determines whether the terminal needs to be connected with a different BS through a $2^{nd}$ RAT. For example, the first BS 100 determines whether the terminal needs to be connected with the second BS 102 on the basis of at least one of communication requirement information received from the terminal, cell load information of the first BS 100, and cell load information of the second BS 102.

If it is determined that the terminal 110 needs to be connected with the different BS through the $2^{nd}$ RAT, the first BS 100 transmits to the terminal a measurement configuration message for the $2^{nd}$ RAT in operation 1230. In this case, the measurement configuration message for the $2^{nd}$ RAT may include at least one of a frequency of the S-RAT to be measured by the terminal 110, an S-RAT measurement report criterion (e.g., a threshold for signal reception strength) information, and S-RAT measurement report period information.

Thereafter, the first BS 100 ends the operating procedure according to an embodiment of the present disclosure.

Figure 13:
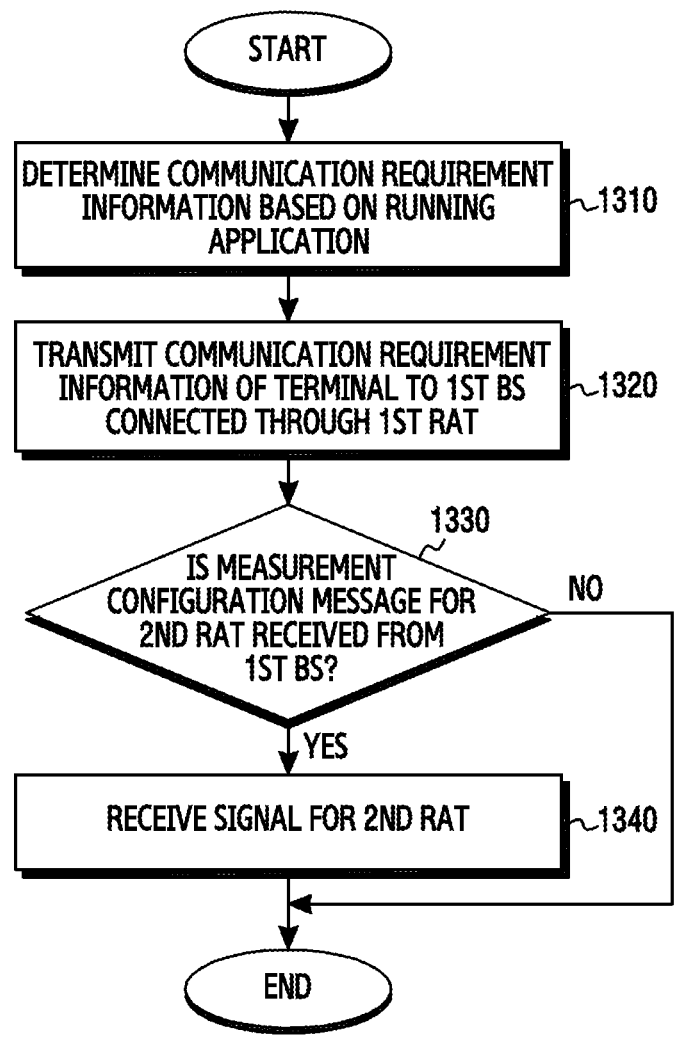
FIG. 13 illustrates an operating procedure of a terminal according to an embodiment of the present disclosure.

FIG. 13 illustrates an operating procedure of a terminal according to an embodiment of the present disclosure.

Referring to FIG. 13, the terminal 110 may determine communication request information indicating a communication requirement on the basis of a running application in operation 1310. For example, the terminal 110 may determine communication requirement information indicating the communication requirement on the basis of information (e.g., a unique identifier) of a running application, or may monitor traffic to determine communication requirement information indicating the communication requirement required by the running application. Further, the terminal 110 may determine preferred RAT information based on a currently activated IP flow as the communication requirement information from an operator policy, and may determine the communication requirement information on the basis of battery information. Herein the terminal 110 may determine the communication requirement by combining at least two of the listed methods of determining the communication requirement information.

In operation 1320, the terminal 110 transmits the communication requirement information of the terminal to a $1^{st}$ BS connected through the $1^{st}$ RAT. Herein, the $1^{st}$ BS may be the first BS 100 wirelessly connected in advance through the $1^{st}$ RAT. Further, the communication requirement information may be transmitted by using an RRC message or may be transmitted by using a PUCCH or a MAC CE.

In operation 1330, the terminal 110 detects whether a measurement configuration message for the $2^{nd}$ RAT is received from the $1^{st}$ BS. For example, the terminal 110 transmits the communication requirement information of the terminal to the $1^{st}$ BS, and thereafter detects whether the measurement configuration message for the $2^{nd}$ RAT is received from the $1^{st}$ BS in response thereto. Herein, the measurement configuration message for the $2^{nd}$ RAT may include at least one of a frequency of the S-RAT to be measured by the terminal 110, an S-RAT measurement report criterion (e.g., a threshold for signal reception strength) information, and S-RAT measurement report period information.

If the measurement configuration message for the $2^{nd}$ RAT is received from the $1^{st}$ BS, in operation 1340, the terminal 110 receives a signal for the $2^{nd}$ RAT on the basis of the received measurement configuration message for the $2^{nd}$ RAT. For example, if the measurement configuration message for the $2^{nd}$ RAT is received, the terminal 110 may allow a $2^{nd}$ RAT communication module for receiving the signal for the $2^{nd}$ RAT to transition from a power-off state to a power-on state. Thereafter, the terminal 110 receives a reference signal which is periodically broadcast from the BS of the $2^{nd}$ RAT on the basis of information included in the measurement configuration message for the $2^{nd}$ RAT through the $2^{nd}$ RAT communication module in the on state. The terminal 110 may measure strength of the reference signal received from the BS of the $2^{nd}$ RAT, and may transmit the measurement report message including the reference signal strength for the $2^{nd}$ RAT to the $1^{st}$ BS.

Thereafter, the terminal 110 ends the operating procedure according to an embodiment of the present disclosure.

Hereinafter, FIG. 14 briefly illustrates an operating procedure in which the terminal 110 determines whether an S-RAT connection is necessary according to an embodiment.

Figure 14:
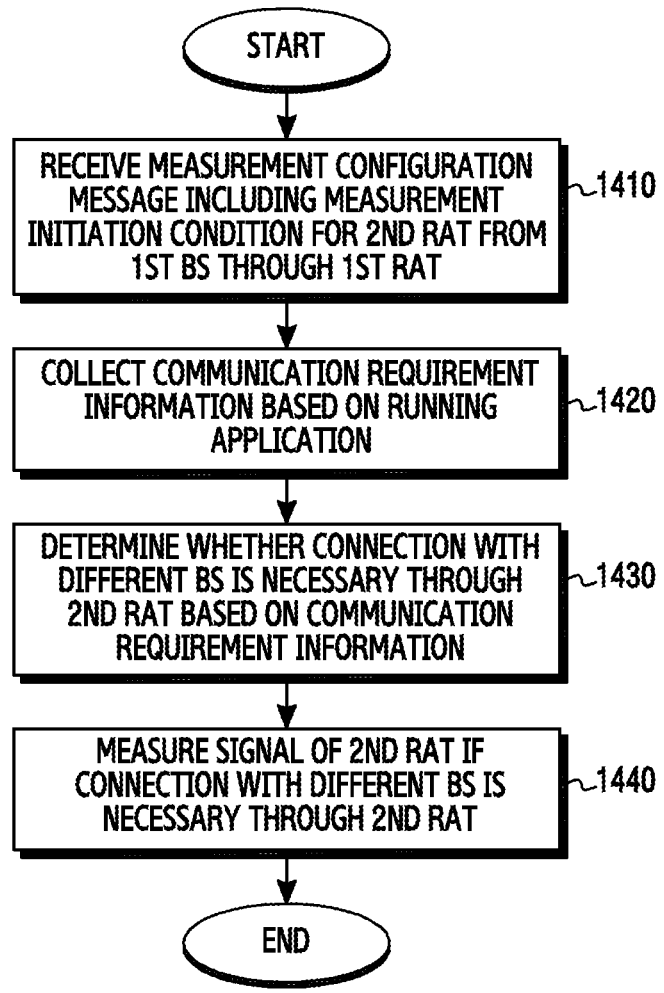
FIG. 14 illustrates an operating procedure of a terminal according to another embodiment of the present disclosure.

FIG. 14 illustrates an operating procedure of a terminal according to another embodiment of the present disclosure.

Referring to FIG. 14, in operation 1410, the terminal 110 receives a measurement configuration message including a measurement initiation condition for a $2^{nd}$ RAT from a $1^{st}$ BS through a $1^{st}$ RAT. The measurement initiation condition for the $2^{nd}$ RAT includes a condition for a communication requirement to be satisfied by the terminal 110 to perform the $2^{nd}$ RAT measurement. Further, the measurement configuration message may be an RRC message, and may include information such as a frequency of the S-RAT to be measured by the terminal 110, a criterion (e.g., a threshold for reception signal strength) for reporting an S-RAT measurement result, a report period for the measurement report, or the like. Herein, the $1^{st}$ BS may be a first BS wirelessly connected with the terminal 110 through the $1^{st}$ RAT.

In operation 1420, the terminal 110 collects communication requirement information on the basis of a running application. For example, the terminal 110 may determine communication requirement information indicating the communication requirement on the basis of information (e.g., a unique identifier) of a running application, or may monitor traffic to determine communication requirement information indicating the communication requirement required by the running application. Further, the terminal 110 may determine preferred RAT information based on a currently activated IP flow as the communication requirement information from an operator policy, and may determine the communication requirement information on the basis of battery information. Herein the terminal 110 may determine the communication requirement by combining at least two of the listed methods of determining the communication requirement information.

In operation 1430, the terminal 110 determines whether a connection with a different BS is necessary through the $2^{nd}$ RAT on the basis of the communication requirement information of the terminal. For example, the terminal 110 determines whether the connection with the different BS is necessary through the $2^{nd}$ RAT on the basis of whether the communication requirement information satisfies the measurement initiation condition for the $2^{nd}$ RAT and received from the $1^{st}$ BS. If the communication requirement information does not satisfy the measurement initiation condition for the $2^{nd}$ RAT and received from the $1^{st}$ BS, the terminal 110 determines that the connection with the different BS is not necessary through the $2^{nd}$ RAT. On the other hand, if the communication requirement information satisfies the measurement initiation condition for the $2^{nd}$ RAT and received from the $1^{st}$ BS, the terminal may determine that the connection with the different BS is necessary through the $2^{nd}$ RAT.

If the connection with the different BS is necessary through the $2^{nd}$ RAT, the terminal 110 measures a signal of the $2^{nd}$ RAT in operation 1440. For example, the terminal 110 transitions the $2^{nd}$ RAT communication module for receiving the signal for the $2^{nd}$ RAT from a power-off state to a power-on state, and thereafter receives a reference signal periodically broadcast from the BS of the $2^{nd}$ RAT. The terminal 110 measures strength of the reference signal received from the BS of the $2^{nd}$ RAT, and may transmit to the $1^{st}$ BS the measurement report message including reference signal strength for the $2^{nd}$ RAT.

Thereafter, the terminal 110 ends the operating procedure according to an embodiment of the present disclosure.

Figure 15:
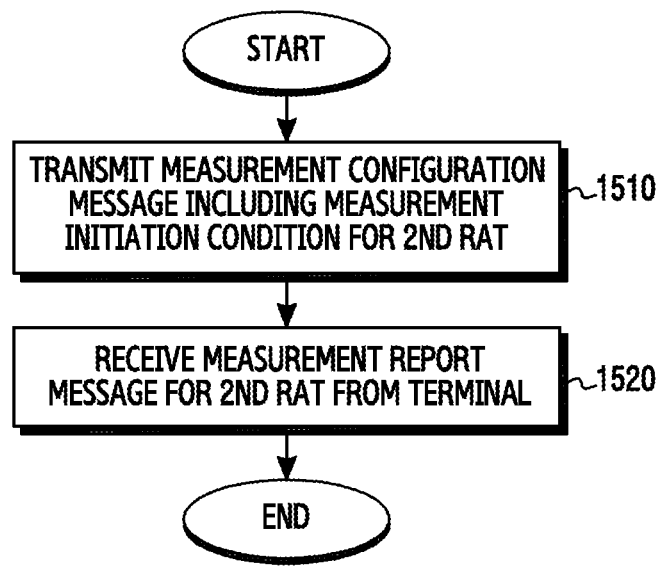
FIG. 15 illustrates an operating procedure of a first BS according to an embodiment of the present disclosure.

FIG. 15 illustrates an operating procedure of a first BS according to an embodiment of the present disclosure.

Referring to FIG. 15, in operation 1510, the first BS 100 transmits a measurement configuration message including a measurement initiation condition for a $2^{nd}$ RAT. The measurement initiation condition for the $2^{nd}$ RAT includes a condition for a communication requirement to be satisfied by the terminal 110 to perform the $2^{nd}$ RAT measurement. Further, the measurement configuration message may be an RRC message, and may include information such as a frequency of the S-RAT to be measured by the terminal 110, a criterion (e.g., a threshold for reception signal strength) for reporting an S-RAT measurement result, a report period for the measurement report, or the like. Herein, the first BS may be a BS wirelessly connected with the terminal 110 through the $1^{st}$ RAT.

In operation 1520, the first BS 100 receives the measurement report message for the $2^{nd}$ RAT from the terminal. The measurement report message for the $2^{nd}$ RAT may be received when the communication requirement information of the terminal 110 satisfies the measurement initiation condition for the $2^{nd}$ RAT. Thereafter, although not shown, the first BS 100 may determine whether a $2^{nd}$ connection is achieved with the terminal 110. Whether the $2^{nd}$ connection is achieved with the terminal 110 may be determined on the basis of the measurement report message for the $2^{nd}$ RAT and received from the terminal 110, cell load information of the first BS 100, cell load information of the BS supporting the $2^{nd}$ RAT, uplink and downlink buffer status information, or the like.

Thereafter, the first BS 100 ends the operating procedure according to an embodiment of the present disclosure.

Figure 16:
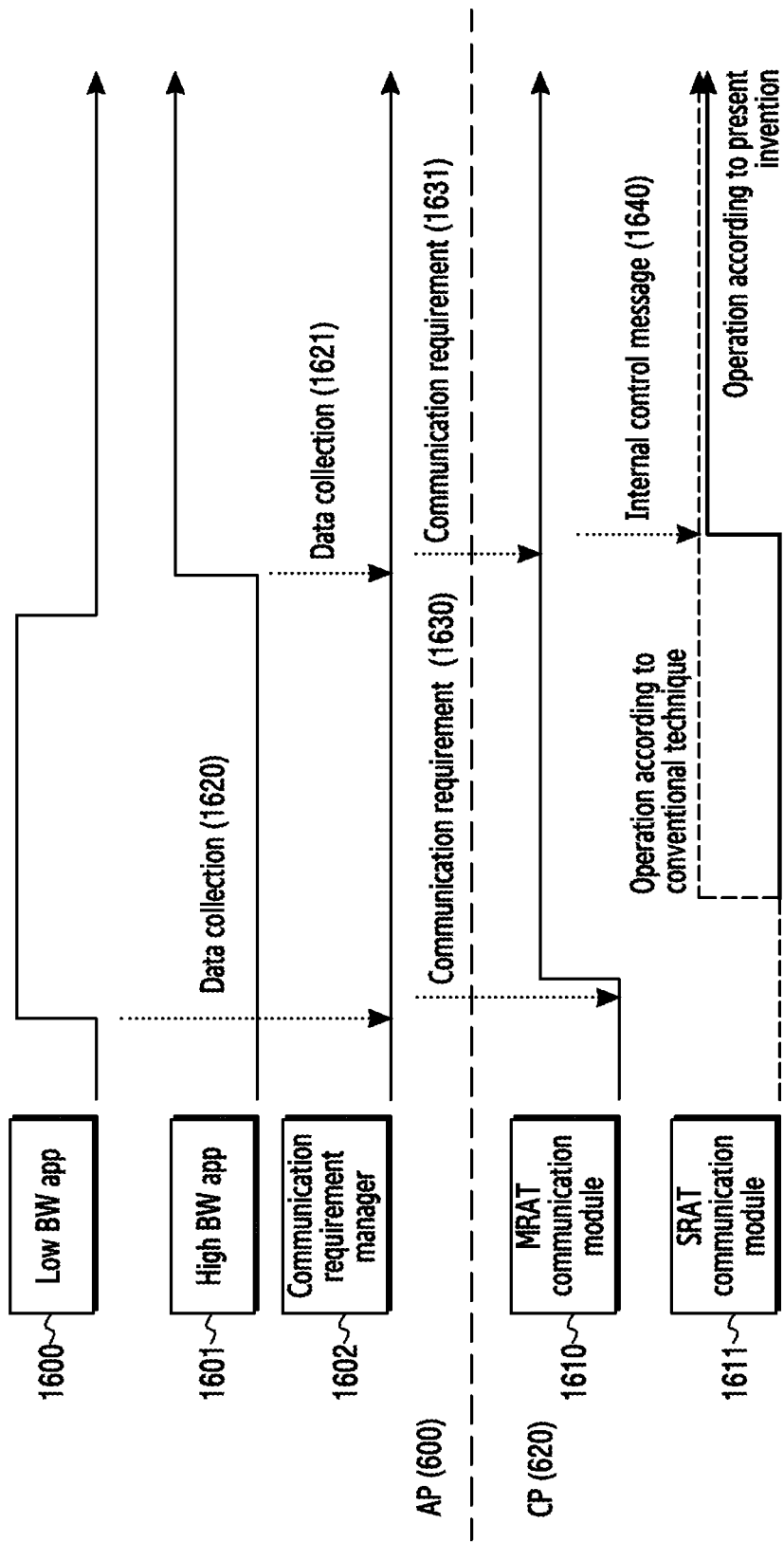
FIG. 16 illustrates an operating state of a communication module of a terminal according to an embodiment of the present disclosure.

FIG. 16 illustrates an operating state of a communication module of a terminal according to an embodiment of the present disclosure.

Referring to FIG. 16, it is shown a case where an app 1600 requiring a low bandwidth runs in the terminal 110, and thereafter when the app is finished, an app 1610 requiring a high bandwidth runs.

In this case, a communication requirement manager 1602 performs data collection 1620 required to determine a communication requirement at a time point at which the app 1600 requiring the low bandwidth runs, determines the communication requirement on the basis of the collected data, and thereafter provides the determined communication requirement 1630 to an MRAT communication module 1610. Alternatively, the communication requirement manager 1602 performs data collection 1621 required to determine the communication requirement at a time point at which an app 1601 requiring the high bandwidth runs, determines the communication requirement on the basis of the collected data, and thereafter provides the determined communication requirement 1631 to the MRAT communication module 1610.

The MRAT communication module 1610 determines that the SRAT connection is not necessary on the basis of the communication requirement 1630 according to the running of the app 1600 requiring the low bandwidth, and maintains the SRAT communication module 1611 to an off state. On the other hand, it is determined that the SRAT connection is necessary on the basis of the communication requirement 1631 according to the running of the app 1601 requiring the high bandwidth, and transmits an internal control message 1640 for allowing the SRAT communication module 1611 to transition to an on state. Accordingly, the SRAT communication module 1611 may transition to the on state to receive and measure a signal for the S-RAT.

As described above, the SRAT communication module operates in the off state when the app 1600 requiring the low bandwidth runs, and operates in the on state when the app 1601 requiring the high bandwidth runs. Therefore, an unnecessary operation of the SRAT communication module can be prevented in a situation where the SRAT connection and/or measurement is unnecessary.

On the other hand, in the terminal according to the conventional technique, the SRAT communication module operates in the on state when the app 1600 requiring the low bandwidth runs. Therefore, the terminal according to an embodiment of the present disclosure has an advantage in that power consumption can be decreased in comparison with the terminal according to the conventional technique.

Methods based on embodiments disclosed in the claims or specification of the present disclosure can be implemented in hardware, software, or a combination of both.

Such software may be stored in a computer readable storage medium. The computer readable storage medium stores at least one program (a software module), i.e., at least one program including instructions for allowing the electronic device to execute the present disclosure when executed by at least one processor in the electronic device.

Such software may be stored in a volatile or non-volatile storage device such as a read only memory (ROM), in a memory such as a random access memory (RAM), memory chips, or a device or integrated circuits, or in an optically or magnetically readable medium such as a compact disc-ROM (CD-ROM), digital versatile discs (DVDs), magnetic disk, magnetic tape, or the like.

The storage device and storage medium are embodiments of a machine-readable storage means that are suitable for storing a program or programs including instructions which implement various embodiments when executed. The various embodiments provide a program including code for implementing an apparatus or a method as claimed in any one of the claims of the present specification and a machine-readable storage medium for storing such a program. Further, such programs may be conveyed electronically via any medium such as a communication signal carried over a wired or wireless connection, and the various embodiments properly include equivalents thereof.

In the aforementioned specific embodiments, a constitutional element included in the present disclosure is expressed in a singular or plural form according to the specific example embodiment proposed herein. However, the singular or plural expression is selected properly for a situation proposed for the convenience of explanation, and thus the various embodiments of the present disclosure are not limited to a single or a plurality of constitutional elements. Therefore, a constitutional element expressed in a plural form can also be expressed in a singular form, or vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a terminal, the method comprising:
   receiving, from a base station (BS) connected by a first radio access technology (RAT), a message requesting a measurement for a second RAT, the message including a threshold value;
   obtaining information indicating requirements for a service of the terminal in response to receiving the message, the information comprising a required bandwidth of an application running in the terminal;
   determining whether the required bandwidth is greater than the threshold value;
   in response to determining that the required bandwidth is greater than the threshold value, measuring a signal of the second RAT based on the message requesting the measurement; and
   transmitting, to the BS, a measurement report associated with a result of the measurement in response to receiving the message,
   wherein frequency bands of the second RAT comprise a frequency band higher than a supported frequency band of the first RAT, and
   wherein the required bandwidth is supported by using the frequency band.

2. The method of claim 1, wherein the information indicating the requirements comprises information indicating whether a connection for the second RAT is necessary by using a value indicating true or false, and information indicating at least one of a required bandwidth of the application, a required latency of application, a required bandwidth level of the application, or a required latency level of the application.

3. The method of claim 1, wherein the information indicating the requirements is acquired on the basis of at least one of a screen direction of the terminal, transmission/reception traffic of the terminal, preferred RAT information based on an operator policy, or battery information.

4. The method of claim 1, wherein the measuring a signal of the second RAT comprises:
   activating a transceiver for the second RAT after determining that the required bandwidth is greater than the threshold value;
   receiving a signal from a second BS supporting the second RAT through the activated transceiver; and
   transmitting to the first BS the measurement report containing signal reception strength from the second BS.

5. The method of claim 4, further comprising:
   determining that the required bandwidth is not greater than the threshold value;
   identifying that a connection for the second RAT is not required based upon determining that the required bandwidth is not greater than the threshold value; and
   controlling the transceiver for the second RAT to be off based upon identifying that the connection for the second RAT is not required.

6. The method of claim 1,
   wherein the message requesting the measurement for the second RAT comprises a condition for a communication requirement to be satisfied in the terminal to trigger a measurement event for the second RAT, and
   wherein the condition for the communication requirement comprises at least one of a condition for a required bandwidth of the terminal, a condition for a required latency of the terminal, a required bandwidth level of the terminal, or a required latency level of the terminal.

7. The method of claim 1, further comprising:
   obtaining a maximum bandwidth required by the application based on monitoring traffic transmitted and received by the application;
   identifying that a screen direction of the terminal is portrait or not;
   in case that it is identified that the screen direction is portrait, determining the required bandwidth of the application by decreasing a predetermined value for a value of the maximum bandwidth;
   in case that it is identified that the screen direction is not portrait, determining the required bandwidth of the application to be the maximum bandwidth; and generating the information indicating the requirements for the service of the terminal based on the determined required bandwidth of the application.

8. A base station (BS) supporting a first radio access technology (RAT), the BS comprising:
a transceiver; and
at least one processor configured to:
receive, from a terminal, information indicating requirements for a service of the terminal, the information comprising a required bandwidth of an application running in the terminal,
transmit, to the terminal, a message requesting a measurement for a second RAT based on the information indicating the requirements for the service of the terminal, the message including a threshold value, and
receive, from the terminal, a measurement report associated with a result of the measurement in response to transmitting the message,
wherein frequency bands of the second RAT comprise a frequency band higher than a supported frequency band of the first RAT,
wherein the required bandwidth is supported by using the frequency band, and
wherein a signal of the second RAT is measured based on the message requesting the measurement in response to determining that the required bandwidth is greater than the threshold value.

9. The BS of claim 8, wherein the information indicating the requirements comprises information indicating whether a connection for the second RAT is necessary by using a value indicating true or false, and information indicating at least one of a required bandwidth of the application, a required latency of the application, a required bandwidth level of the application, or a required latency level of the application.

10. The BS of claim 8, wherein the at least one processor is further configured to determine whether the terminal needs to be connected with a different BS through the second RAT on a basis of at least one of the received information indicating the requirements, load information of the BS supporting the first RAT, load information of the different BS supporting the second RAT, a channel state between the terminal and the BS supporting the first RAT, or a channel state between the terminal and the different BS supporting the second RAT.

11. The BS of claim 8, wherein the at least one processor is further configured to:
receive from the terminal the measurement report for the second RAT,
determine whether the terminal is connected with a different BS supporting the second RAT on a basis of the received measurement report for the second RAT, and
upon determining that the terminal is connected with the different BS supporting the second RAT, transmit a connection instruction message to at least one of the terminal or the different BS supporting the second RAT.

12. The BS of claim 11, wherein the at least one processor is further configured to determine whether the terminal is connected with the different BS supporting the second RAT on a basis of at least one of the received measurement report for the second RAT, an uplink data amount of the terminal, or a downlink data amount of the terminal.

13. The BS of claim 8, wherein the at least one processor is further configured to:
receive from the terminal the measurement report for the second RAT, and
determine whether the terminal is connected with the second RAT,
wherein the message requesting the measurement for the second RAT comprises a condition for a communication requirement to be satisfied in the terminal to trigger a measurement event for the second RAT.

14. The BS of claim 8, wherein, in order to receive the information indicating the requirements, the at least one processor is further configured to:
in case that it is identified that a screen direction is portrait, receive the information indicating the requirements comprising the required bandwidth of the application that is determined by decreasing a predetermined value for a value of a maximum bandwidth, and
in case that it is identified that the screen direction is not portrait, receive the information indicating the requirements comprising the required bandwidth of the application that is identical to the maximum bandwidth,
wherein the maximum bandwidth required by the application is obtained based on traffic transmitted and received by the application.

15. A terminal comprising:
a transceiver; and
at least one processor configured to:
receive, from a base station (BS) connected by a first radio access technology (RAT), a message requesting a measurement for a second RAT, the message including a threshold value,
obtaining information indicating requirements for a service of the terminal in response to receiving the message, the information comprising a required bandwidth of an application running in the terminal,
determine whether the required bandwidth is greater than the threshold value,
in response to determining that the required bandwidth is greater than the threshold value, measure a signal of the second RAT based on the message requesting the measurement, and
transmit, to the BS, a measurement report associated with a result of the measurement in response to receiving the message,
wherein frequency bands of the second RAT comprise a frequency band higher than a supported frequency band of the first RAT, and
wherein the required bandwidth is supported by using the frequency band.

16. The terminal of claim 15, wherein the information indicating the requirements comprises information indicating whether a connection for the second RAT is necessary by using a value indicating true or false, and information indicating at least one of a required bandwidth of the application, a required latency of application, a required bandwidth level of the application, or a required latency level of the application.

17. The terminal of claim 15, wherein the information indicating the requirements is acquired on a basis of at least one of a screen direction of the terminal, transmission/reception traffic of the terminal, preferred RAT information based on an operator policy, or battery information.

18. The terminal of claim 15,
wherein the transceiver comprises a first communication module supporting the first RAT and a second communication module supporting the second RAT, and
wherein, in order to measure a signal of the second RAT, the at least one processor is further configured to:

activate a communication module for the second RAT after determining that the required bandwidth is greater than the threshold value, receive a signal from a second BS supporting the second RAT through the activated communication module, and transmit to the first BS the measurement report containing signal reception strength from the second BS.

19. The terminal of claim 18, wherein the at least one processor is further configured to:

determine that the required bandwidth is not greater than the threshold value, identify that a connection for the second RAT is not required based upon determining that the required bandwidth is not greater than the threshold value, and control the transceiver for the second RAT to be off based upon identifying that the connection for the second RAT is not required.

20. The terminal of claim 15, wherein the message requesting the measurement for the second RAT comprises a condition for a communication requirement to be satisfied in the terminal to trigger a measurement event for the second RAT, and wherein the condition for the communication requirement comprises at least one of a condition for a required bandwidth of the terminal, a condition for a required latency of the terminal, a required bandwidth level of the terminal, or a required latency level of the terminal.

21. The terminal of claim 15, wherein the at least one processor is further configured to:

obtain a maximum bandwidth required by the application based on monitoring traffic transmitted and received by the application, identify that a screen direction of the terminal is portrait or not, in case that it is identified that the screen direction is portrait, determine the required bandwidth of the application by decreasing a predetermined value for a value of the maximum bandwidth, in case that it is identified that the screen direction is not portrait, determine the required bandwidth of the application to be the maximum bandwidth, and generate the information indicating the requirements for the service of the terminal based on the determined required bandwidth of the application.

* * * * *